(12) United States Patent
Hamada et al.

(10) Patent No.: US 9,359,138 B2
(45) Date of Patent: Jun. 7, 2016

(54) ASSEMBLY/TRANSPORT APPARATUS

(71) Applicant: TSUBAKIMOTO CHAIN CO., Osaka (JP)

(72) Inventors: Hiroaki Hamada, Osaka (JP); Isao Takatori, Osaka (JP)

(73) Assignee: TSUBAKIMOTO CHAIN CO., Osaka (JP)

(*) Notice: Subject to any disclaimer, the term of this patent is extended or adjusted under 35 U.S.C. 154(b) by 0 days.

(21) Appl. No.: 14/845,253

(22) Filed: Sep. 3, 2015

(65) Prior Publication Data

US 2016/0068341 A1   Mar. 10, 2016

(30) Foreign Application Priority Data

Sep. 10, 2014   (JP) .................................. 2014-184644

(51) Int. Cl.
| B65G 47/60 | (2006.01) |
| B65G 21/22 | (2006.01) |
| B65G 47/22 | (2006.01) |
| B65G 9/00 | (2006.01) |

(52) U.S. Cl.
CPC ................ B65G 9/004 (2013.01); B65G 9/008 (2013.01)

(58) Field of Classification Search
CPC ........................... B65G 47/643; B65G 37/005
USPC .......... 198/343.1, 345.3, 346.1, 346.2, 346.3, 198/347.1, 465.1, 580; 414/927, 928, 929
See application file for complete search history.

(56) References Cited

U.S. PATENT DOCUMENTS

| 5,465,827 | A | | 11/1995 | Nakagawa et al. | |
| 5,577,597 | A | * | 11/1996 | Kakida et al. | B65G 37/02 198/346.2 |
| 5,922,230 | A | * | 7/1999 | Yokota | B23K 1/008 198/465.3 |
| 6,008,476 | A | * | 12/1999 | Neiconi et al. | B23K 37/047 198/465.3 |
| 6,236,021 | B1 | * | 5/2001 | Fair et al. | C03B 29/08 219/388 |
| 6,752,258 | B2 | * | 6/2004 | Ludwig et al. | B65G 35/06 198/463.1 |
| 6,769,536 | B2 | * | 8/2004 | Lutz | B65G 21/06 198/465.1 |
| 6,814,221 | B2 | * | 11/2004 | Goussev | B65G 35/08 198/435 |
| 7,275,635 | B2 | * | 10/2007 | Enya | B65G 37/02 198/463.2 |

(Continued)

FOREIGN PATENT DOCUMENTS

JP   S62-171522 U   10/1987
JP   H02-169406 A   6/1990

(Continued)

OTHER PUBLICATIONS

Japanese Office Action with partial translation dated Sep. 1, 2015.

*Primary Examiner* — Douglas Hess
(74) *Attorney, Agent, or Firm* — Rabin & Berdo, P.C.

(57) ABSTRACT

An assembly/transport apparatus includes: a carrier on which a transport object is mounted; a transport track; a return track that overlies the transport track in a top/bottom direction; a first transfer device that transfers the carrier between the transport track and the return track; a second transfer device that transfers the carrier between the transport track and the return track; and a frame that supports the transport track, the return track, the first transfer device and the second transfer device. The transport track includes transport driving devices that cause the carrier to travel and stop. The return track includes return driving devices that cause the carrier to travel and stop. The first transfer device includes first transfer driving devices that cause the carrier to travel and stop. The second transfer device includes second transfer driving devices that cause the carrier to travel and stop.

9 Claims, 27 Drawing Sheets

(56) References Cited

U.S. PATENT DOCUMENTS

| | | | |
|---|---|---|---|
| 7,547,183 B2 * | 6/2009 | Boettcher et al. | B65G 63/025 414/789.9 |
| 7,748,514 B2 * | 7/2010 | Shimizu et al. | B65G 47/46 198/346.1 |
| 7,871,232 B2 * | 1/2011 | Lutz | B65G 1/0492 198/463.3 |
| 8,528,717 B2 * | 9/2013 | Ando et al. | B41F 17/005 198/306 |
| 8,997,969 B2 * | 4/2015 | Plakolm | B23Q 7/005 198/346.2 |
| 9,022,204 B2 * | 5/2015 | Wang et al. | B65G 47/643 198/435 |

FOREIGN PATENT DOCUMENTS

| | | |
|---|---|---|
| JP | H05-162839 A | 6/1993 |
| JP | H08-247246 A | 9/1996 |
| JP | 2009-286501 A | 12/2009 |
| JP | 2013-237521 A | 11/2013 |

\* cited by examiner

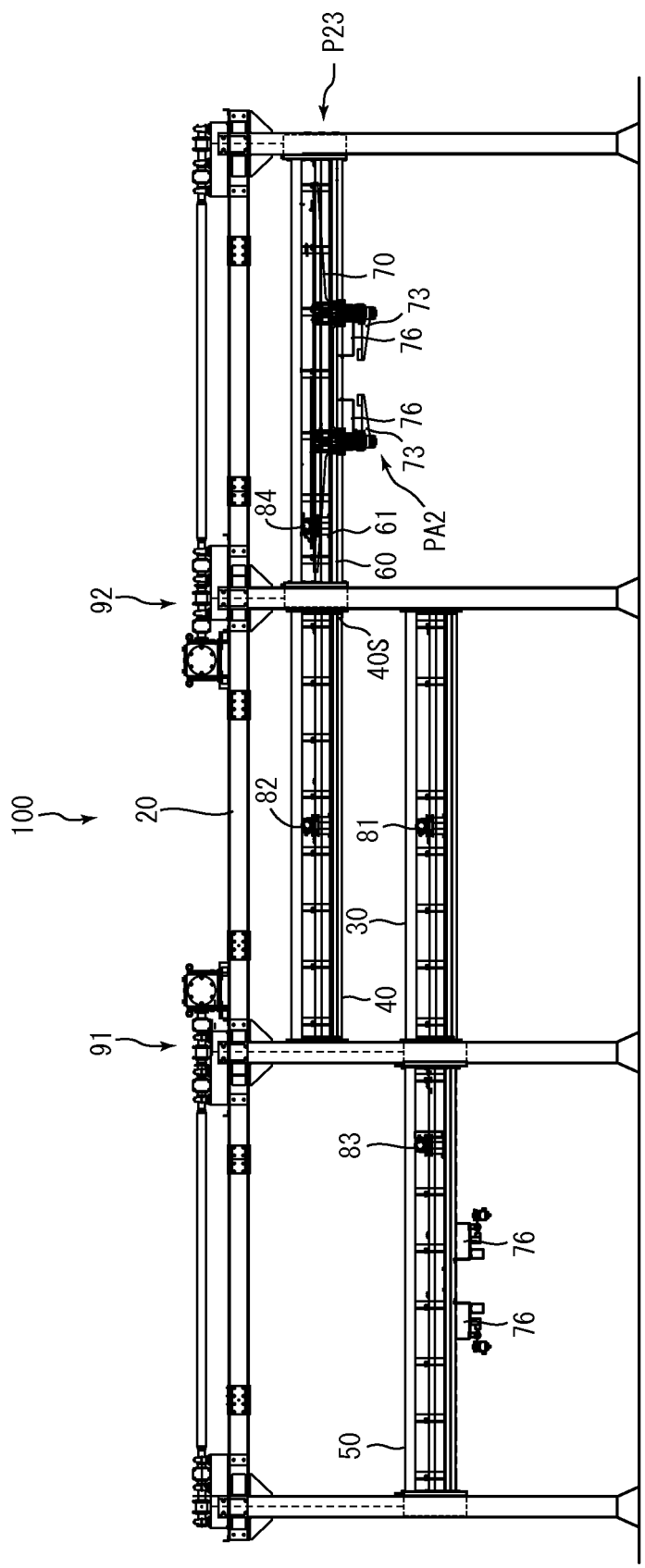
FIG. 25
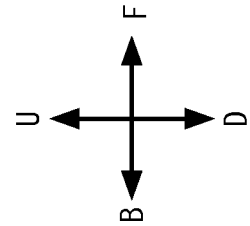

ASSEMBLY/TRANSPORT APPARATUS

CROSS-REFERENCE TO RELATED APPLICATION

This application is based upon and claims the benefit of priority of the prior Japanese Patent Application No. 2014-184644, filed Sep. 10, 2014, the entire contents of which are incorporated herein by reference.

BACKGROUND

1. Technical Field

The present invention relates to an assembly/transport apparatus including a carrier on which a transport object is mounted. More particularly, the present invention relates to an assembly/transport apparatus including a transport track for conveying a carrier on which a transport object is mounted and a return track for returning an empty carrier from which a transport object has been removed.

2. Description of the Background Art

Assembly/transport apparatuses including carriers on which transport objects are mounted are known. An assembly/transport apparatus includes a transport track and a return track. The transport track conveys a carrier on which a transport object is mounted. The transport track has one or more stop positions arranged from upstream toward downstream in the transport direction, for example. At each stop position, a carrier on which a transport object is mounted stops such that specific work can be done on the transport object. When the work is finished, the transport object is removed from the carrier. The empty carrier after the removal of the transport object is returned by the return track to the starting end of the transport track.

An assembly/transport apparatus including a transport track and return track that are disposed on the ceiling of a building is known. If a transport track and a return track are to be disposed on the ceiling of a building, the transport track and return track are arranged in a horizontal direction. Arranging a transport track and a return track in a horizontal direction requires a large space in a horizontal direction. Further, arranging the transport track and return track requires that the ceiling of the building be reinforced.

JP 2013-237521 A discloses an assembly/transport apparatus having a transport track and return track overlying each other in the top/bottom direction. The transport track and return track are supported by a frame standing on the floor. The carrier is conveyed by a screw. The screw extends along the transport track. The entire screw is composed of a plurality of screw units coupled to each other in a direction of the transport track. A driving unit that drives the screw is positioned at one end of the screw.

In the assembly/transport apparatus described in JP 2013-237521 A, the transport track and return track are positioned to overlie each other in the top/bottom direction to reduce the horizontal space required by the assembly/transport apparatus.

Further, as the transport track and return track are supported by a frame, the assembly/transport apparatus may be installed to be independent from the building, eliminating the need to reinforce the ceiling of the building.

However, the screw used in the conventional assembly/transport apparatus discussed above does not transmit driving forces very efficiently, because the angle of elevation of the screw disperses the driving force from the driving unit in directions that are different from the transport direction. The driving force dispersed by the screw has a twisting effect on the frame supporting the screw and driving unit.

Further, in the conventional assembly/transport apparatus discussed above, the entire screw is composed of a plurality of screw units. The driving unit that rotates the screw is positioned at an end of the screw. As a single driving unit rotates the entire screw, the unit is required to be a high-output one. As such, the driving force dispersed by the screw is also large, resulting in a large twisting effect on the frame.

Furthermore, in the conventional assembly/transport apparatus discussed above, a longer transport track requires a screw with a full length that is increased accordingly, which requires a driving unit with higher output. Moreover, a frame with higher rigidity must be used to counter the increased twisting effect.

Thus, the conventional assembly/transport apparatus requires a frame with a high rigidity. This results in a frame with a complicated structure and increased weight, making it difficult to install the assembly/transport apparatus.

The present application discloses an assembly/transport apparatus that has a frame with a simple structure and reduced weight and thus is easier to install.

SUMMARY

An assembly/transport apparatus in an embodiment of the present invention includes: a carrier on which a transport object is mounted; a transport track that allows the carrier to travel in a transport direction; a return track that allows the carrier to travel in a return direction; a first transfer device that transfers the carrier from the return track to the transport track; a second transfer device that transfers the carrier from the transport track to the return track; and a frame. The transport track extends in the transport direction. The transport direction is the direction in which the transport object is transported. The return track extends in the return direction and overlies the transport track in a top/bottom direction. The return direction is the direction opposite to the transport direction. The first transfer device includes a first transfer track that allows the carrier to travel. The first transfer track is movable in the top/bottom direction between a position at which it is connected with a starting end of the transport track and a position at which it is connected with a terminating end of the return track. The second transfer device includes a second transfer track that allows the carrier to travel. The second transfer track is movable in the top/bottom direction between a position at which it is connected with a terminating end of the transport track and a position at which it is connected with a starting end of the return track. The frame supports the transport track, the return track, the first transfer device and the second transfer device. The transport track includes: one or more transport stop positions that are defined as positions at which the carrier can stop; a transport driving device provided to correspond to each transport stop position; and a transport driving source provided for each transport driving device. The transport driving device drives the carrier in the transport direction and stops the carrier at the transport stop position. The return track includes: one or more return stop positions that are defined as positions at which the carrier can stop; a return driving device provided to correspond to each return stop position; and a return driving source provided for each return driving device. The return driving device drives the carrier in the return direction and stops the carrier at the return stop position. The first transfer device includes a first transfer driving device and a first transfer driving source provided for the first transfer driving device. The first transfer driving device drives the carrier in the transport direction and the return direction and stops the carrier on the first transfer track. The second transfer device includes a second transfer driving device and a second transfer driving source provided for the second transfer driving device. The second transfer driving device drives the carrier in the transport direction and the return direction and stops the carrier on the second transfer track.

In the assembly/transport apparatus in an embodiment of the present invention, the structure of the frame can be simplified and its weight reduced, thereby making it easier to install the assembly/transport apparatus.

BRIEF DESCRIPTION OF THE DRAWINGS

FIG. 25 is a right side view of the assembly/transport apparatus.

DESCRIPTION OF THE EMBODIMENTS

Figure 1:
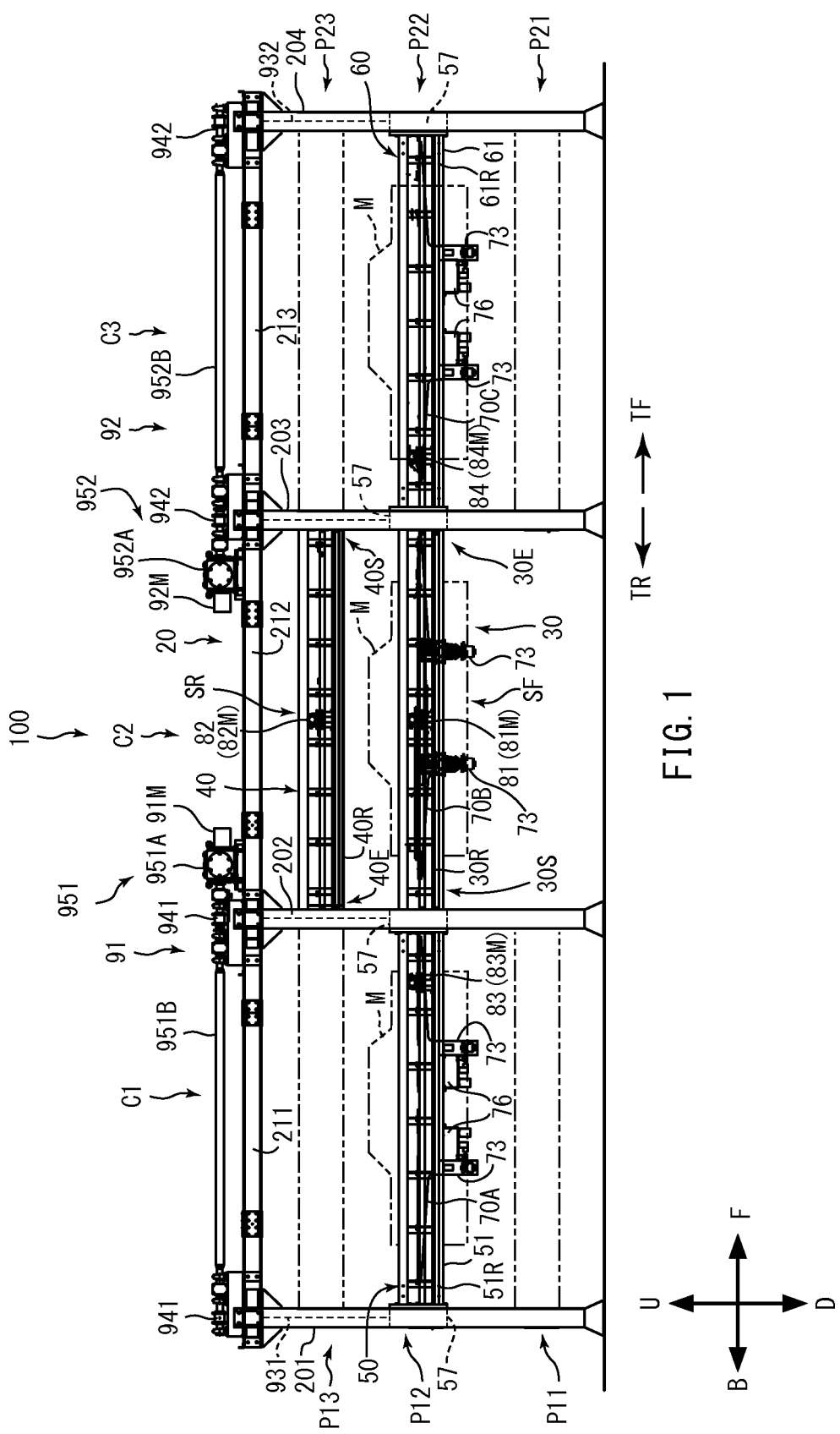
FIG. 1 is a right side view of an assembly/transport apparatus in an embodiment of the present invention.

An assembly/transport apparatus in an embodiment of the present invention includes: a carrier on which a transport object is mounted; a transport track that allows the carrier to travel in a transport direction; a return track that allows the carrier to travel in a return direction; a first transfer device that transfers the carrier from the return track to the transport track; a second transfer device that transfers the carrier from the transport track to the return track; and a frame. The transport track extends in the transport direction. The transport direction is the direction in which the transport object is transported. The return track extends in the return direction and overlies the transport track in a top/bottom direction. The return direction is the direction opposite to the transport direction. The first transfer device includes a first transfer track that allows the carrier to travel. The first transfer track is movable in the top/bottom direction between a position at which it is connected with a starting end of the transport track and a position at which it is connected with a terminating end of the return track. The second transfer device includes a second transfer track that allows the carrier to travel. The second transfer track is movable in the top/bottom direction between a position at which it is connected with a terminating end of the transport track and a position at which it is connected with a starting end of the return track. The frame supports the transport track, the return track, the first transfer device and the second transfer device. The transport track includes: one or more transport stop positions that are defined as positions at which the carrier can stop; a transport driving device provided to correspond to each transport stop position; and a transport driving source provided for each transport driving device. The transport driving device drives the carrier in the transport direction and stops the carrier at the transport stop position. The return track includes: one or more return stop positions that are defined as positions at which the carrier can stop; a return driving device provided to correspond to each return stop position; and a return driving source provided for each return driving device. The return driving device drives the carrier in the return direction and stops the carrier at the return stop position. The first transfer device includes a first transfer driving device and a first transfer driving source provided for the first transfer driving device. The first transfer driving device drives the carrier in the transport direction and the return direction and stops the carrier on the first transfer track. The second transfer device includes a second transfer driving device and a second transfer driving source provided for the second transfer driving device. The second transfer driving device drives the carrier in the transport direction and the return direction and stops the carrier on the second transfer track (first arrangement).

In the above arrangement, the transport track includes a transport driving device provided to correspond to the transport stop position for a carrier. Further, the return track includes a return driving device provided to correspond to the return stop position for a carrier. As the transport driving device and return driving device are disposed in a dispersed manner, a twisting effect or the like is less likely to be concentrated on a portion of the frame. This enables simplifying the structure of the frame and thus reducing its weight, thereby making it easier to install the assembly/transport apparatus.

Starting from the first arrangement, the left/right direction is a direction perpendicular to the transport direction and the return direction. The transport track may include a right transport track portion and a left transport track portion arranged in the left/right direction with respect to the transport direction. The right transport track portion and the left transport track portion may each include a transport driving device provided to correspond to each transport stop position. The return track may include a right return track portion and a left return track portion arranged in the left/right direction with respect to the return direction. The right return track portion and the left return track portion may each include a return driving device provided to correspond to each return stop position. The first transfer track may include a first right transfer track portion and a first left transfer track portion arranged in the left/right direction with respect to the transport direction. The first right transfer track portion and the first left transfer track portion may each include a first transfer driving device. The second transfer track may include a second right transfer track portion and a second left transfer track portion arranged in the left/right direction with respect to the transport direction. The second right transfer track portion and the second left transfer track portion may each include a second transfer driving device (second arrangement).

In the above arrangement, the transport driving devices, return driving devices, first transfer driving devices and second transfer driving devices are positioned to the left and right with respect to the assembly/transport apparatus. This eliminates the necessity for a mechanism for distributing a driving force to the left and right, which enables simplifying the structure of the assembly/transport apparatus.

Starting from the first or second arrangement, the transport driving device, the return driving device, the first transfer driving device and the second transfer driving device may each include a transmission unit that transmits a driving force to the carrier. The carrier may include a power receiving portion that extends in a travel direction and is contactable with the transmission unit to receive a driving force from the transport driving device, the return driving device, the first transfer driving device and the second transfer driving device, the travel direction being the direction in which the carrier travels. The power receiving portion may have a length that makes the portion contactable with two of the transmission units that are adjacent in the transport direction at the same time when the carrier travels in the transport direction and contactable with two of the transmission units that are adjacent in the return direction at the same time when it travels in the return direction (third arrangement). That is, the length of the power receiving portion measured in the travel direction may be equal to or greater than the distance between two transmission units that are adjacent in the travel direction.

In the above arrangement, the transport track, return track, first transfer track and second transfer track have a common configuration for transmitting a driving force to the carrier. This enables simplifying the structure of the assembly/transport apparatus.

Starting from the third arrangement, the transport driving device, the return driving device, the first transfer driving device and the second transfer driving device may each include a guiding device that guides the power receiving portion of the carrier from a state in which it is separated from the transmission unit to a state in which it is in contact with the transmission unit (fourth arrangement).

In the above arrangement, the transmission unit of a driving device can engage with the power receiving portion of the carrier smoothly from the separated state to the contact state.

Starting from the fourth arrangement, the guiding device may include a position changing mechanism that changes a position of the transmission unit to be aligned with the power receiving portion of the carrier (fifth arrangement).

In the above arrangement, the position of the transmission unit of a driving device is changed to be aligned with the power receiving portion of the carrier. Thus, the transmission unit of the driving device can engage with the power receiving portion of the carrier smoothly from the separate state to the contact state.

Starting from one of the first to fifth arrangements, the assembly/transport apparatus may further include: a first hoisting device that raises and lowers the first transfer device along the frame; and a second hoisting device that raises and lowers the second transfer device along the frame. The first hoisting device may include: a plurality of first suspension members connected with the first transfer device; a plurality of first hoisting units provided to correspond to the first suspension members; a first dividing device connected with the plurality of first hoisting units; and a first hoisting driving source that supplies a driving force to the first dividing device. The first hoisting units raise and lower the first suspension members. The first dividing device divides a driving force among the plurality of first hoisting units. The second hoisting device may include: a plurality of second suspension members connected with the second transfer device; a plurality of second hoisting units provided to correspond to the second suspension members; a second dividing device connected with the plurality of second hoisting units; and a second hoisting driving source that supplies a driving force to the second dividing device. The second hoisting units raise and lower the second suspension members. The second dividing device divides a driving force among the plurality of second hoisting units (sixth arrangement).

In the above arrangement, the first and second hoisting devices each includes a dividing device for dividing the driving force from the associated hoisting driving source to the associated suspension members. Thus, a simple arrangement may be used to raise and lower a plurality of suspension members in a synchronized manner.

Starting from one of the first to sixth arrangements, the carrier may include a rotatable arm and an operated portion connected with the arm. The arm may be rotatable between a first arm position in which the transport object can be mounted and a second arm position in which the arm is withdrawn from the transport object. The operated portion may be movable between a first operated position that corresponds to the first arm position and a second operated position that corresponds to the second arm position. The first transfer device and the second transfer device may each include an operating unit that is movable between an engaged position and a withdrawn position. The engaged position is a position in which the operating unit engages with the operated portion. The withdrawn position is a position in which the operating unit is withdrawn from the operated portion. The operating unit may move the operated portion between the first operated position and the second operated position while in the engaged position in which it engages with the operated portion (seventh arrangement).

In the above arrangement, the carrier needs to include no arrangement for driving the arm, which enables simplifying the structure of the arm.

Starting from one of the first to seventh arrangements, the frame may include a plurality of vertical frame portions that extend in the top/bottom direction and support the first transfer track and the second transfer track. In each of the plurality of vertical frame portions, an up/down travelling device may be provided that travels in the up/down direction along the vertical frame portion. In this case, the first transfer track and the second transfer track may be supported by the vertical frame portions via the associated up/down travelling devices (eighth arrangement).

In the above arrangement, a simple arrangement may be used to move the first and second transfer tracks in the up/down direction.

Starting from the second arrangement, the carrier may include a right carrier portion that travels on the right transport track portion, the right return track portion, the first right transfer track portion and the second right transfer track portion and a left carrier portion that travels on the left transport track portion, the left return track portion, the first left transfer track portion and the second left transfer track portion. The carrier may include an arm that is rotatable about an up/down axis. The arm may be rotatable between a first arm position in which it projects into a space between the right carrier portion and the left carrier portion and the transport object can be mounted, and a second arm position in which it is withdrawn from the space between the right carrier portion and the left carrier portion (ninth arrangement).

In the above arrangement, a simple structure may be used to switch between the state in which a transport object may be mounted between the left and right carrier portions and the state in which the space between the left and right carrier portions is empty.

[Embodiments]

Now, an assembly/transport apparatus in an embodiment of the present invention will be described in detail with reference to the drawings. In the drawings, the same or corresponding components are labeled with the same reference characters and their description will not be repeated. For ease of explanation, in the drawings to which reference will be made below, the components are simplified or shown schematically, and some components are omitted. It should be noted that the size ratios between the components shown in the drawings do not necessarily represent the actual size ratios.

[Overall Construction]

First, the overall construction of an assembly/transport apparatus 100 will be described. FIG. 1 is a right side view of the assembly/transport apparatus 100 in an embodiment of the present invention. Arrow F indicates the forward/front with respect to the assembly/transport apparatus 100, and arrow B indicates the rearward/back with respect to the assembly/transport apparatus 100. Arrow U indicates the upward with respect to the assembly/transport apparatus 100, and arrow D indicates the downward with respect to the assembly/transport apparatus 100. In the following description, the transport direction TF is the direction in which a carrier 70 with a transport object M mounted thereon travels, and the return direction TR is the direction in which an empty carrier 70 from which the transport object M has been removed travels.

As shown in FIG. 1, the assembly/transport apparatus 100 includes a frame 20, a transport track 30, a return track 40, a first transfer device 50, a second transfer device 60, a carrier 70 (70A, 70B and 70C), a first hoisting device 91 and a second hoisting device 92. The assembly/transport apparatus 100 further includes a control unit (not shown) that controls the operation of each of the first transfer device 50, second transfer device 60, first hoisting device 91, second hoisting device 92 and other components. The assembly/transport apparatus 100 in the present embodiment may be used, for example, in an assembly step where parts are mounted on the transport object M, for example. The transport object M may be, for example, a chassis of an automobile. In the context of the assembly/transport apparatus 100, the transport object M is mounted on the carrier 70 and thus transported. The assembly/transport apparatus 100 stops the carrier 70 at predefined stop positions. Work is done, for example parts are mounted, on the object when the carrier is at a stop position. It is assumed that, in FIG. 1, a transport object M indicated by phantom lines is mounted on each of the carriers 70A, 70B and 70C.

The frame 20 supports the transport track 30, return track 40, first transfer device 50 and second transfer device 60. In FIG. 1, the right side of the assembly/transport apparatus 100 is visible. The assembly/transport apparatus 100 includes, to the right and arranged at an interval in the front/rear direction, a first vertical frame portion 201, a second vertical frame portion 202, a third vertical frame portion 203 and a fourth vertical frame portion 204. Although not visible in FIG. 1, the assembly/transport apparatus 100 includes, to the left and arranged in a mirrored manner, a first vertical frame portion 201, a second vertical frame portion 202, a third vertical frame portion 203 and a fourth vertical frame portion 204.

In the assembly/transport apparatus 100, to the right, the top of the first vertical frame portion 201 and the top of the second vertical frame portion 202 are connected with each other by a first front/rear frame portion 211. The top of the second vertical frame portion 202 and the top of the third vertical frame portion 203 are connected with each other by a second front/rear frame portion 212. The top of the third vertical frame portion 203 and the top of the fourth vertical frame portion 204 are connected with each other by a third front/rear frame portion 213. Although not visible in FIG. 1, the left side of the assembly/transport apparatus 100 has an analogous construction.

In the following description, in side view, the region between the first and second vertical frame portions 201 and 202 is referred to as first region C1, the region between the second and third vertical frame portions 202 and 203 is referred to as second region C2, and the region between the third and fourth vertical frame portions 203 and 204 is referred to as third region C3.

The transport track 30 and return track 40 are located in the second region C2. The transport track 30 and return track 40 are located between the second and third vertical frame portions 202 and 203 in side view.

The transport track 30 extends in the front/rear direction. The transport track 30 allows the carrier 70 with the transport object M mounted thereon to travel from the rear toward the front. The transport direction TF is the direction from the rear toward the front.

The transport track 30 includes a right transport track portion 30R and a left transport track portion 30L. In FIG. 1, the right transport track portion 30R located to the right is visible. The right transport track portion 30R is fixed to the second and third vertical frame portions 202 and 203 that are located to the right with respect to the assembly/transport apparatus 100. Although not visible in FIG. 1, the left transport track portion 30L is fixed to the second and third vertical frame portions 202 and 203 that are located to the left with respect to the assembly/transport apparatus 100. Separate left and right carrier 70 portions are capable of travelling independently on the right and left transport track portions 30R and 30L. That is, there are a carrier 70 portion that travels on the right transport track portion 30R and a carrier 70 portion that travels on the left transport track portion 30L.

A transport stop position SF is defined on the transport track 30 at which the left and right carrier 70 portions are to be stopped. At the transport stop position SF, the carrier 70 with a transport object M mounted thereon is stopped and stays there temporarily such that predetermined work can be done on the transport object M. The transport stop position SF in the present embodiment is defined such that the transport object M mounted on the carrier 70 is located between the second and third vertical frame portions 202 and 203. In the present embodiment, one transport stop position SF is provided. Alternatively, the length of the transport track 30 in the front/rear direction may be increased and a plurality of transport stop positions SF may be defined.

Transport driving devices 81 are provided on the transport track 30. A transport driving device 81 is provided on the right transport track portion 30R for the transport stop position SF. A transport driving device 81 is provided on the left transport track portion 30L for the transport stop position SF. A transport driving source 81M is provided for each of the transport driving devices 81. The left and right transport driving devices 81 drive the left and right carrier 70 portions in the transport direction TF in a synchronized manner, and stop the left and right carrier 70 at the transport stop position SF in a synchronized manner.

The return track 40 is located above the transport track 30 in side view. The return track 40 extends in the front/rear direction. The return track 40 allows an empty carrier 70 from which a transport object M has been removed to travel from the front toward the rear. The return direction TR is the direction from the front toward the rear. The return direction TR is opposite to the transport direction TF.

The return track 40 includes a right return track portion 40R and left return track portion 40L. In FIG. 1, the right return track portion 40R located to the right is visible. The right return track portion 40R is fixed to the second and third vertical frame portions 202 and 203 that are located to the right with respect to the assembly/transport apparatus 100. Although not visible in FIG. 1, the left return track portion 40L is fixed to the second and third vertical frame portions 202 and 203 that are located to the left with respect to the assembly/transport apparatus 100. Separate left and right carrier 70 portions are capable of travelling independently on the right and left return track portions 40R and 40L. That is, there are a carrier 70 portion that travels on the right return track portion 40R and a carrier 70 portion that travels on the left return track portion 40L.

A return stop position SR is defined on the return track 40 at which the carrier 70 is to be stopped. At the return stop position SR, the empty carrier 70 from which a transport object M has been removed is stopped and stays there temporarily, and waits until it is transported downstream. In the present embodiment, the return stop position SR is located above the transport stop position SF. In the present embodiment, one return stop position SR is provided. Alternatively, the length of the return track 40 in the front/rear direction may be increased and a plurality of return stop positions SR may be defined.

Return driving devices 82 are provided on the return track 40. A return driving device 82 is provided on the right return track portion 40R for the return stop position SR. A return driving device 82 is provided on the left return track portion 40L for the return stop position SR. A return driving source 82M is provided for each of the return driving devices 82. The left and right return driving devices 82 drive the left and right carrier 70 portions in the return direction TR in a synchronized manner, and stop the carrier 70 portions at the return stop position SR.

The first transfer device 50 is located in the first region C1. The first transfer device 50 is located between the first and second vertical frame portions 201 and 202 in side view.

The first transfer device 50 extends in the front/rear direction. The first transfer device 50 includes a first transfer track 51 that allows the carrier 70 to travel in the front/rear direction. The ends of the first transfer track 50 disposed in the travel direction of the carrier 70 are supported by the associated up/down travelling devices 57.

The first transfer track 51 includes a first right transfer track portion 51R and a first left transfer track portion 51L. In FIG. 1, the first right transfer track portion 51R located to the right is visible. The first right transfer track portion 51R is supported, via the associated up/down travelling devices 57, on the first and second vertical frame portions 201 and 202 that are located to the right with respect to the assembly/transport apparatus 100. The up/down travelling devices 57 travel along the first and second vertical frame portions 201 and 202. Although not visible in FIG. 1, similar to the first right transfer track portion 51R, the first left transfer track portion 51L is supported, via the associated up/down travelling devices 57, on the first and second vertical frame portions 201 and 202 that are located to the left with respect to the assembly/transport apparatus 100. Separate left and right carrier 70 portions are capable of travelling independently on the first right and left transfer track portions 51R and 51L. That is, there are a carrier 70 portion that travels on the first right transfer track portion 51R and a carrier 70 portion that travels on the first left transfer track portion 51L.

The first transfer device 50 is capable of moving along the first and second vertical frame portions 201 and 202 between a mount position P11, a first transport position P12 and a first return position P13. When the device is at the mount position P11, a transport object M can be mounted on the carrier 70 on the first transfer track 51. When the device is at the first transport position P12, the first transfer track 51 is connected with the starting end 30S of the transport track 30. When the device is at the first return position P13, the first transfer track 51 is connected with the terminating end 40E of the return track 40. The first transfer device 50 moves between the mount position P11, first transport position P12 and first return position P13 to transfer the carrier 70 between the transport track 30 and return track 40.

The first right transfer track portion 51R includes a first transfer driving device 83. The first left transfer track portion 51L also includes a first transfer driving device 83. A first transfer driving source 83M is provided on each of the first transfer driving devices 83. The left and right first transfer driving devices 83 drive the left and right carrier 70 portions on the first transfer track 51 in the transport direction TF and return direction TR in a synchronized manner, and stop the carrier 70 on the first transfer track 51. If a transport object M is mounted on the carrier 70 stopped on the first transfer track 51, predetermined work can be done on the transport object M.

The second transfer device 60 is located in the third region C3. The second transfer device 60 is located between the third and fourth vertical frame portions 203 and 204 in side view.

The second transfer device 60 extends in the front/rear direction. The second transfer device 60 includes a second transfer track 61 that allows the carrier 70 to travel in the front/rear direction. The ends of the second transfer track 61 disposed in the travel direction of the carrier 70 are supported by the associated up/down travelling devices 57.

The second transfer track 61 includes a second right transfer track portion 61R and a second left transfer track portion 61L. In FIG. 1, the second right transfer track portion 61R located to the right is visible. The second right transfer track portion 61R is supported, via the associated up/down travelling devices 57, on the third and fourth vertical frame portions 203 and 204 that are located to the right with respect to the assembly/transport apparatus 100. Although not visible in FIG. 1, similar to the second right transfer track portion 61R, the second left transfer track portion 61L is supported, via the associated up/down travelling devices 57, on the third and fourth vertical frame portions 203 and 204 that are located to the left with respect to the assembly/transport apparatus 100. Separate left and right carrier 70 portions are capable of travelling independently on the second right and left transfer track portions 61R and 61L. That is, there are a carrier 70 portion that travels on the second right transfer track portion 61R and a carrier 70 portion that travels on the second left transfer track portion 61L.

The second transfer device 60 is capable of moving along the third and fourth vertical frame portions 203 and 204 between a removal position P21, a second transport position P22 and a second return position P23. When the device is at the removal position P21, a transport object M can be removed from the carrier 70 on the second transfer track 61. When the device is at the second transport position P22, the second transfer track 61 is connected with the terminating end 30E of the transport track 30. When the device is at the second return position P23, the second transfer track 61 is connected with the starting end 40S of the return track 40. The second transfer device 60 moves between the removal position P21, second transport position P22 and second return position P23 to transfer the carrier 70 between the transport track 30 and return track 40.

The second right transfer track portion 61R includes a second transfer driving device 84. The second left transfer track portion 61L also includes a second transfer driving device 84. A second transfer driving source 84M is provided on each of the second transfer driving devices 84. The left and right second transfer driving devices 84 drive the left and right carrier 70 portions on the second transfer track 61 in the transport direction TF and return direction TR in a synchronized manner, and stop the carrier 70 on the second transfer track 61. If a transport object M is mounted on the carrier 70 stopped on the second transfer track 61, predetermined work can be done on the transport object M.

The first hoisting device 91 raises and lowers the first transfer device 50 along the first and second vertical frame portions 201 and 202. The first hoisting device 91 includes a first suspension member 931, a first hoisting unit 941, a first dividing device 951, and a first hoisting driving source 91M. The first suspension member 931 is a chain, for example, and is connected with the first transfer device 50. In the present embodiment, a first suspension member 931 is connected with each of the up/down travelling devices 57 that travel up and down along the first and second vertical frame portions 201 and 202. The first hoisting unit portions 941 are provided to correspond to the first suspension members 931 to raise and lower the first suspension members 931. The first hoisting unit 941 includes sprockets, for example, that correspond to the chains that constitute the first suspension members 931. The first dividing device 951 is connected with the first hoisting unit portions 941 and divides a driving force among the first hoisting unit portions 941. The first dividing device 951 includes a reduction gear 951A and drive shafts 951B that connects the first hoisting unit portions 941. The first hoisting driving source 91M supplies a driving force to the first dividing device 951. The first hoisting driving source 91M is a motor, for example, that is connected with the reduction gear 951A.

The second hoisting device 92 raises and lowers the second transfer device 60 along the third and fourth vertical frame portions 203 and 204. The second hoisting device 92 includes a second suspension member 932, a second hoisting unit 942, a second dividing device 952, and a second hoisting driving source 92M. The second suspension member 932 is a chain, for example, and is connected with the second transfer device 60. In the present embodiment, a second suspension member 932 is connected with each of the up/down travelling devices 57 that travel up and down along the third and fourth vertical frame portions 203 and 204. The second hoisting unit portions 942 are provided to correspond to the second suspension members 932 to raise and lower the second suspension members 932. The second hoisting unit 942 includes sprockets, for example, that correspond to the chains that constitute the second suspension members 932. The second dividing device 952 is connected with the second hoisting unit portions 942 and divides a driving force among the second hoisting unit portions 942. The second dividing device 952 includes, for example, a reduction gear 951A and drive shafts 951B that connect the second hoisting unit portions 942. The second hoisting driving source 92M supplies a driving force to the second dividing device 952. The second hoisting driving source 92M is a motor, for example, that is connected with the reduction gear 951A.

In FIG. 1, a carrier 70A is stationary on the first transfer device 50, a carrier 70B is stationary on the transport track 30, and a carrier 70C is stationary on the second transfer device 60. Arms 73 are provided on each of the carriers 70A, 70B and 70C for mounting a transport object M thereon. The first and second transfer devices 50 and 60 each includes an arm operating unit 76 for switching arms 73 between their positions.

Figure 2:
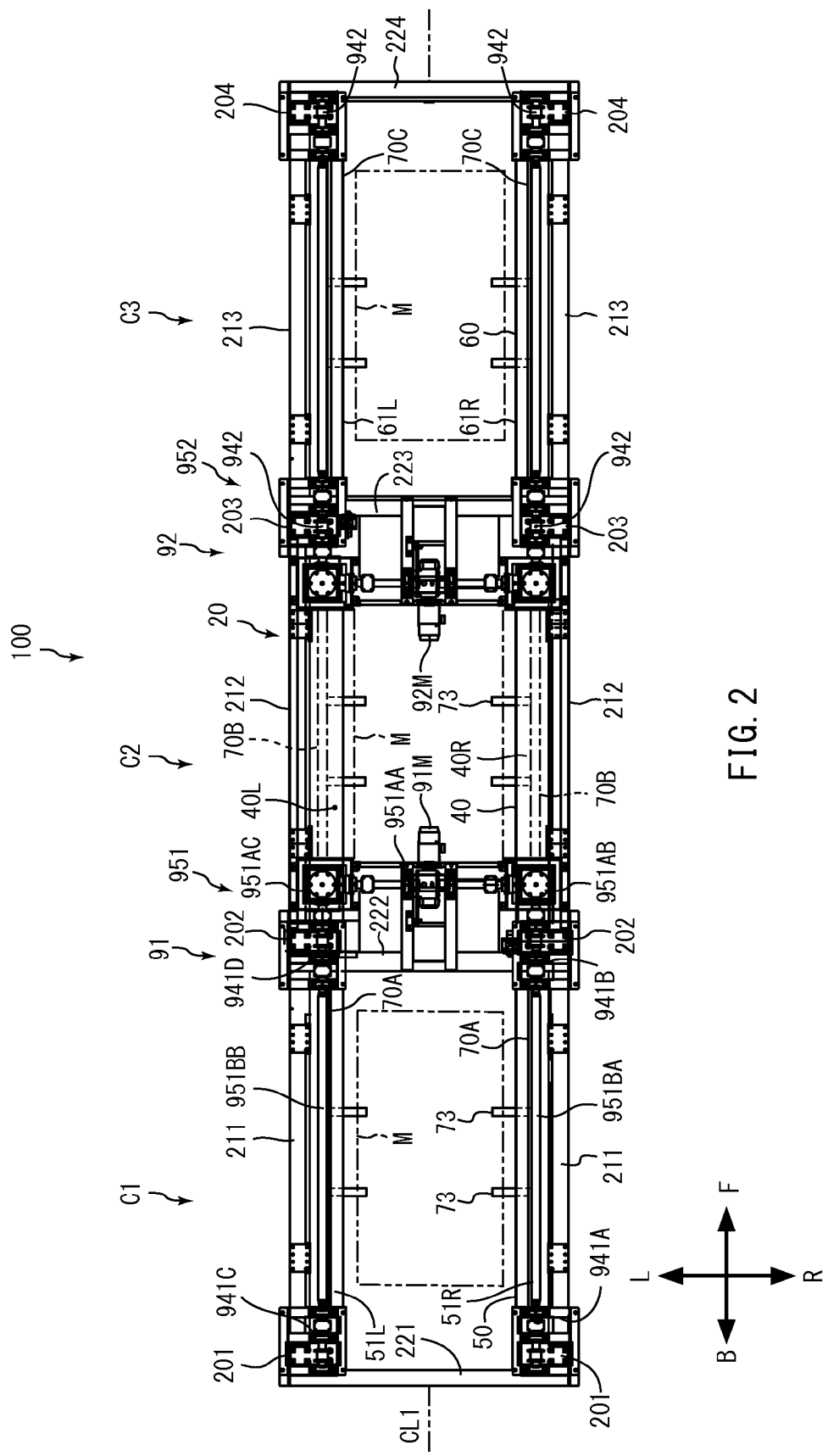
FIG. 2 is a top plan view of the assembly/transport apparatus.

FIG. 2 is a top plan view of the assembly/transport apparatus 100. Arrow F indicates the forward/front with respect to the assembly/transport apparatus 100, and arrow B indicates the rearward/back with respect to the assembly/transport apparatus 100. Arrow R indicates the right with respect to the assembly/transport apparatus 100, and arrow L indicates the left with respect to the assembly/transport apparatus 100.

In FIG. 2, the top of the assembly/transport apparatus 100 is visible. The assembly/transport apparatus 100 includes the first, second, third and fourth frame portions 201, 202, 203 and 204, located to the left and right and spaced apart from each other in the front/rear direction.

The first vertical frame portions 201 are connected with the second vertical frame portions 202 by the first front/rear frame portions 211. The second vertical frame portions 202 are connected with the third vertical frame portions 203 by the second front/rear frame portions 212. The third vertical frame portions 203 are connected with the fourth vertical frame portions 204 by the third front/rear frame portions 213.

The left and right first vertical frame portions 201 are connected by a first transverse frame portion 221. The left and right second vertical frame portions 202 are connected by a second transverse frame portion 222. The left and right third vertical frame portions 203 are connected by a third transverse frame portion 223. The left and right fourth vertical frame portions 204 are connected by a fourth transverse frame portion 224.

The first transfer device 50 is visible in the first region C1. The first transfer track 51 includes a first right transfer track portion 51R and a first left transfer track portion 51L. The first right and left transfer track portions 51R and 51L are positioned in a mirrored manner to the right and left with respect to central line CL1 extending in the front/rear direction of the assembly/transport apparatus 100. Each of the carrier portions 70A is stationary on the associated one of the first right and left transfer track portions 51R and 51L. The arms 73 of the carrier 70A support a transport object M.

The return track 40 is visible in the second region C2 of FIG. 2. The return track 40 includes a right return track portion 40R and a left return track portion 40L. The right and left return track portions 40R and 40L are positioned in a mirrored manner to the right and left with respect to central line CL1 extending in the front/rear direction of the assembly/transport apparatus 100.

The second transfer device 60 is visible in the third region C3. The second transfer track 61 includes a second right transfer track portion 61R and a second left transfer track portion 61L. The second right and left transfer track portions 61R and 61L are positioned in a mirrored manner to the right and left with respect to central line CL1 extending in the front/rear direction of the assembly/transport apparatus 100. Each of the carrier portions 70C is stationary on the associated one of the second right and left transfer track portions 61R and 61L. The arms 73 of the carrier 70C support a transport object M.

The first and second hoisting devices 91 and 92 are located on top of the frame 20.

The first hoisting device 91 includes a first hoisting unit portion 941A, a first hoisting unit portion 941B, a first hoisting unit portion 941C and first hoisting unit portion 941D that constitute the first hoisting unit 941, located on top of the left and right first vertical frame portions 201 and the left and right second vertical frame portions 202. The first hoisting unit portions 941A and 941B are connected by a drive shaft 951BA. The first hoisting unit portions 941C and 941D are connected by a drive shaft 951BB.

The first hoisting driving source 91M is connected with a reduction gear portion 951AA. The reduction gear portion 951AA is capable of providing power toward the left and right. The reduction gear portion 951AA is connected with a reduction gear portion 951AB and a reduction gear portion 951AC via their respective shafts. The reduction gear portions 951AB and 951AC are capable of providing power toward the front. The reduction gear portion 951AB is connected with the first hoisting unit portion 941B via a shaft. The reduction gear portion 951AC is connected with the first hoisting unit portion 941D via a shaft.

In the first hoisting device 91, power provided by the first hoisting driving source 91M is divided by the first dividing device 951 constituted by the reduction gear and shafts among the first hoisting unit portions 941A, 941B, 941C and 941D. Thus, the first hoisting device 91 is capable of raising and lowering the first right and left transfer track portions 51R and 51L of the first transfer device 50 in a synchronized manner.

The second hoisting device 92 has a construction analogous to that of the first hoisting device 91. Power from the second hoisting driving source 92M is divided by the second dividing device 952 constituted by the reduction gear and shafts among the second hoisting unit portions 942. Thus, the second hoisting device 92 is capable of raising and lowering the second right and left transfer track portions 61R and 61L of the second transfer device 50 in a synchronized manner.

Figure 3:
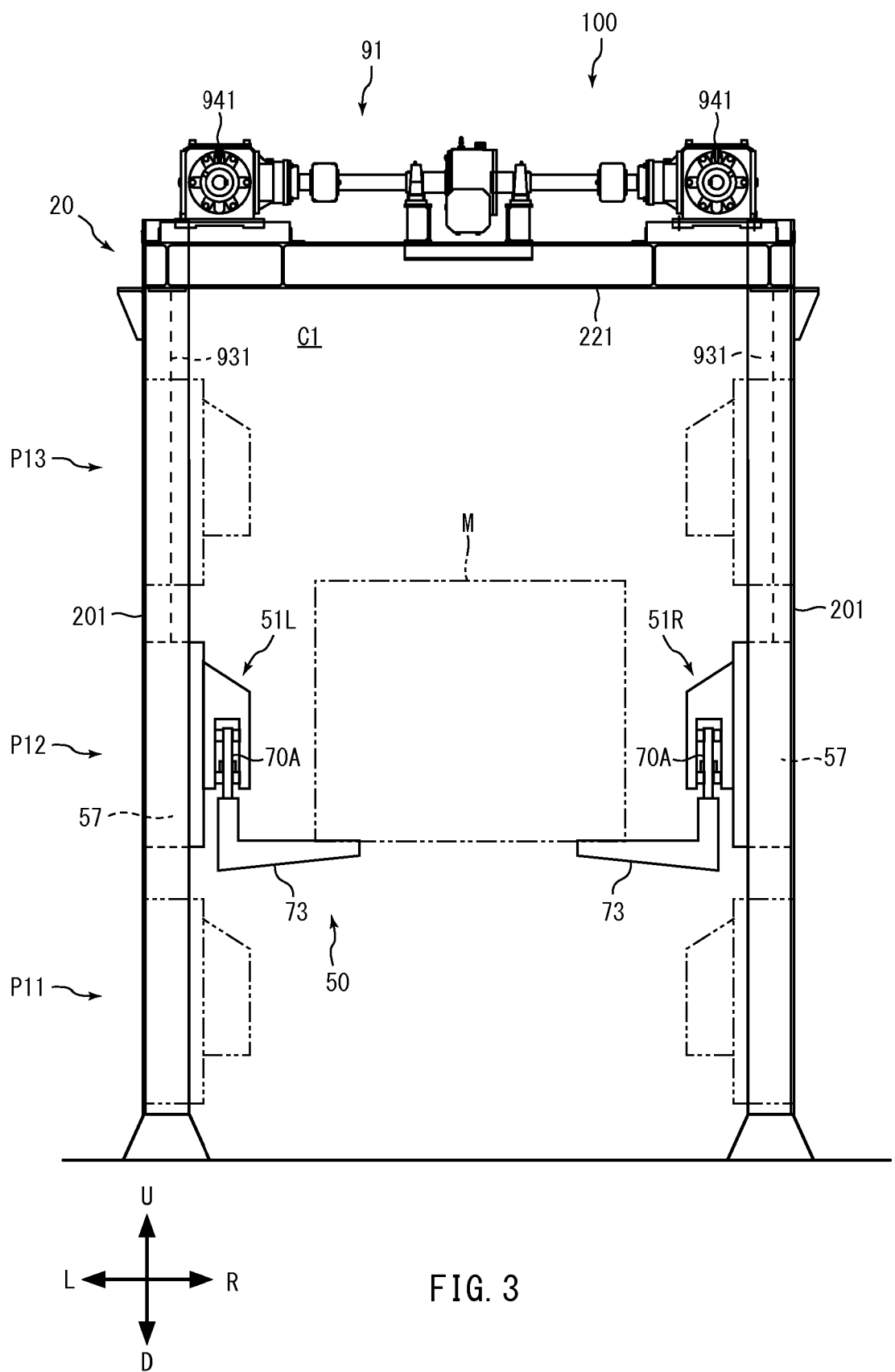
FIG. 3 is a rear view of the assembly/transport apparatus.

FIG. 3 is a rear view of the assembly/transport apparatus 100. Arrow U indicates the upward with respect to the assembly/transport apparatus 100, and arrow D indicates the downward with respect to the assembly/transport apparatus 100. Arrow R indicates the right with respect to the assembly/transport apparatus 100, and arrow L indicates the left with respect to the assembly/transport apparatus 100.

In FIG. 3, the rear of the assembly/transport apparatus 100 is visible. The assembly/transport apparatus 100 includes the first vertical frame portions 201, located to the left and right and spaced apart in the left/right direction. The left and right first vertical frame portions 201 are connected by the first transverse frame portion 221.

In FIG. 3, the first transfer device 50 located in the first region C1 is visible. The first transfer track 51 includes the first right transfer track portion 51R and first left transfer track portion 51L. The first right and left transfer track portions 51R and 51L are positioned in a mirrored manner to the right and left. Each of the first right and left transfer track portions 51R and 51L supports a carrier portion 70A. The arms 73 of the carrier 70A support a transport object M.

The first right and left transfer track portions 51R and 51L are supported by the right and left first vertical frame portions 201, respectively, via the respective up/down travelling devices 57. The up/down travelling devices 57 are capable of travelling along the respective first vertical frame portions 201. A chain that constitutes a first suspension member 931 is connected with the top of each up/down travelling device 57.

The first hoisting device 91 is provided on top of the assembly/transport apparatus 100. The first hoisting unit 941 is provided on top of the left and right first vertical frame portions 201. The first hoisting unit 941 includes sprockets that correspond to the chains that constitute the first suspension members 931. A chain is wound around each sprocket. The first hoisting device 91 raises and lowers the left and right, front and rear chains that constitute the first suspension members 931 in a synchronized manner. As the left and right, front and rear chains are raised and lowered in a synchronized manner, the first right and left transfer track portions 51R and 51L move in the top/bottom direction in a synchronized manner. The first right and left transfer track portions 51R and 51L are capable of moving along the right and left first vertical frame portions 201 between the mount position P11, first transport position P12 and first return position P13.

Figure 4:
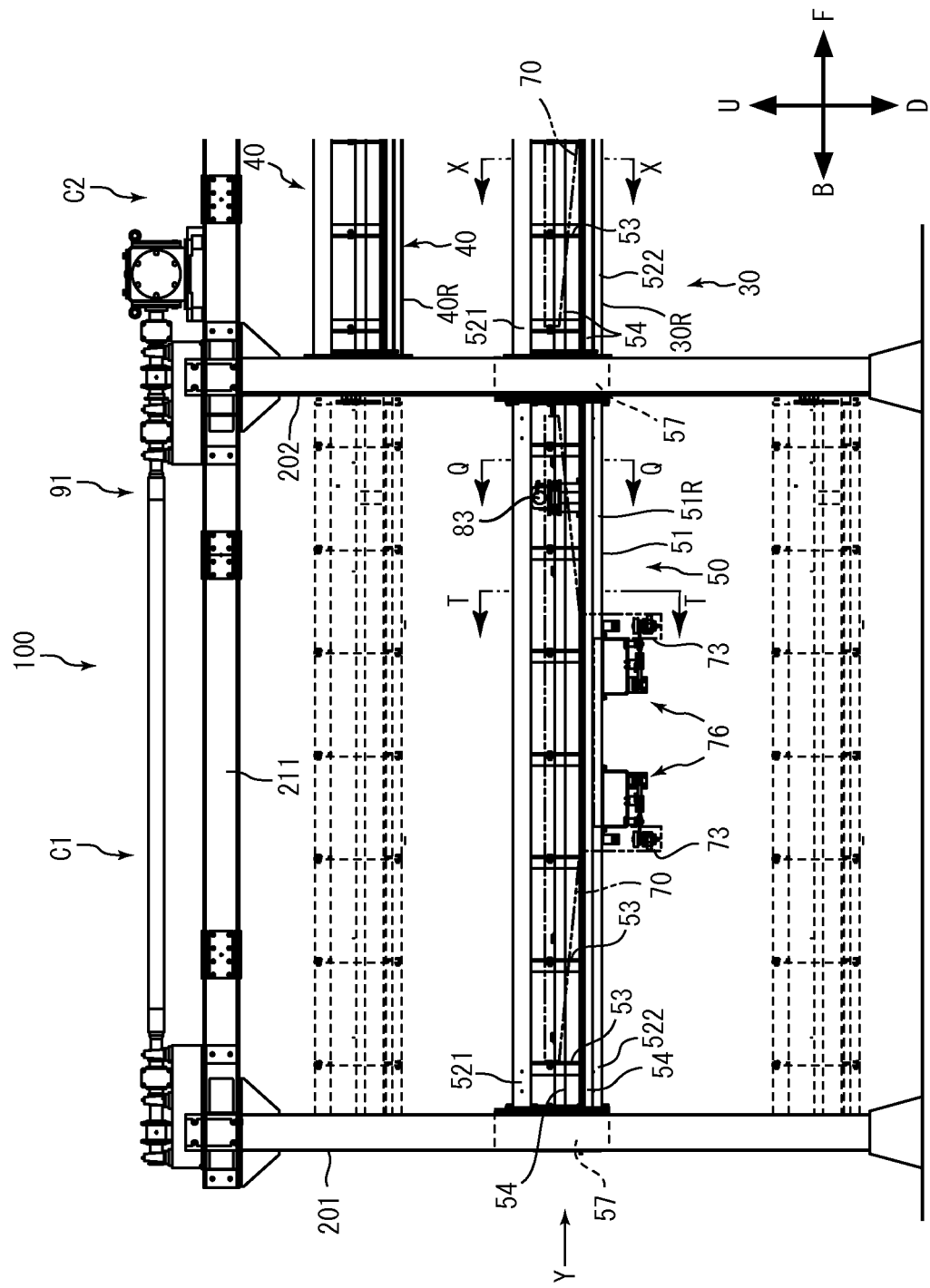
FIG. 4 is a right side view of a portion of the assembly/transport apparatus.

FIG. 4 is a right side view of a portion of the assembly/transport apparatus 100. Arrow F indicates the forward/front with respect to the assembly/transport apparatus 100, and arrow B indicates the rearward/back with respect to the assembly/transport apparatus 100. Arrow U indicates the upward with respect to the assembly/transport apparatus 100, and arrow D indicates the downward with respect to the assembly/transport apparatus 100.

The first transfer device 50 is located in the first region C1 of FIG. 4. The first transfer device 50 includes the first transfer track 51 that allows a carrier 70 to travel in the front/rear direction (i.e. transport direction or return direction). In FIG. 4, the right transfer track portion 51R located to the right is visible. The associated carrier 70 portion is stationary on the first right transfer track portion 51R.

The first right transfer track portion 51R includes an upper frame portion 521, a lower frame portion 522, and a plurality of brackets 53. The upper and lower frame portions 521 and 522 extend in the front/rear direction. The front end and rear end of the upper frame portion 521 are fixed to the associated up/down travelling devices 57. The front end and rear end of the lower frame portion 522 are fixed to the associated up/down travelling devices 57. The brackets 53 are fixed to the upper and lower frame portions 521 and 522. The brackets 53 support a rail frame 54. Although not described in detail, the first left transfer track portion 51L has a configuration that is a mirror image of that of the first right transfer track portion 51R. The first right and left transfer track portions 51R and 51L are capable of moving in the top/bottom direction along the respective first vertical frame portions 201 and the respective second vertical frame portions 202.

The transport track 30 and return track 40 are located in the second region C2 of FIG. 4. The transport track 30 includes the right and left transport track portions 30R and 30L. In FIG. 4, the right transport track portion 30R located to the right is visible. The associated carrier 70 portion is stationary on the right transport track portion 30R.

Similar to the right transfer track portion 51R of the first transfer device 50, the right transport track portion 30R includes an upper frame portion 521, a lower frame portion 522, and a plurality of brackets 53. The upper and lower frame portions 521 and 522 extend in the front/rear direction. In the right transport track portion 30R, unlike in the first right transfer track portion 51R of the first transfer device 50, the rear end of the upper frame portion 521 is fixed to the associated second vertical frame portion 202. Although not shown, the front end of the upper frame portion 521 is fixed to the associated third vertical frame portion 203. The brackets 53 are fixed to the upper and lower frame portions 521 and 522. The brackets 53 support a rail frame 54. Although not described in detail, the left transport track portion 30L has a configuration that is a mirror image of that of the right transport track portion 30R. The right and left transport track portions 30R and 30L are fixed to the respective second vertical frame portions 202 and the respective third vertical frame portions 203.

The return track 40 includes a right return track portion 40R and a left return track portion 40L. In FIG. 4, the right return track portion 40R located to the right is visible. The right return track portion 40R has the same configuration as the right transport track portion 30R of the transport track 30. The left return track portion 40L has a configuration that is a mirror image of that of the right return track portion 40R. The right and left return track portions 40R and 40L are fixed to the respective second vertical frame portions 202 and the respective third vertical frame portions 203.

Figure 5:
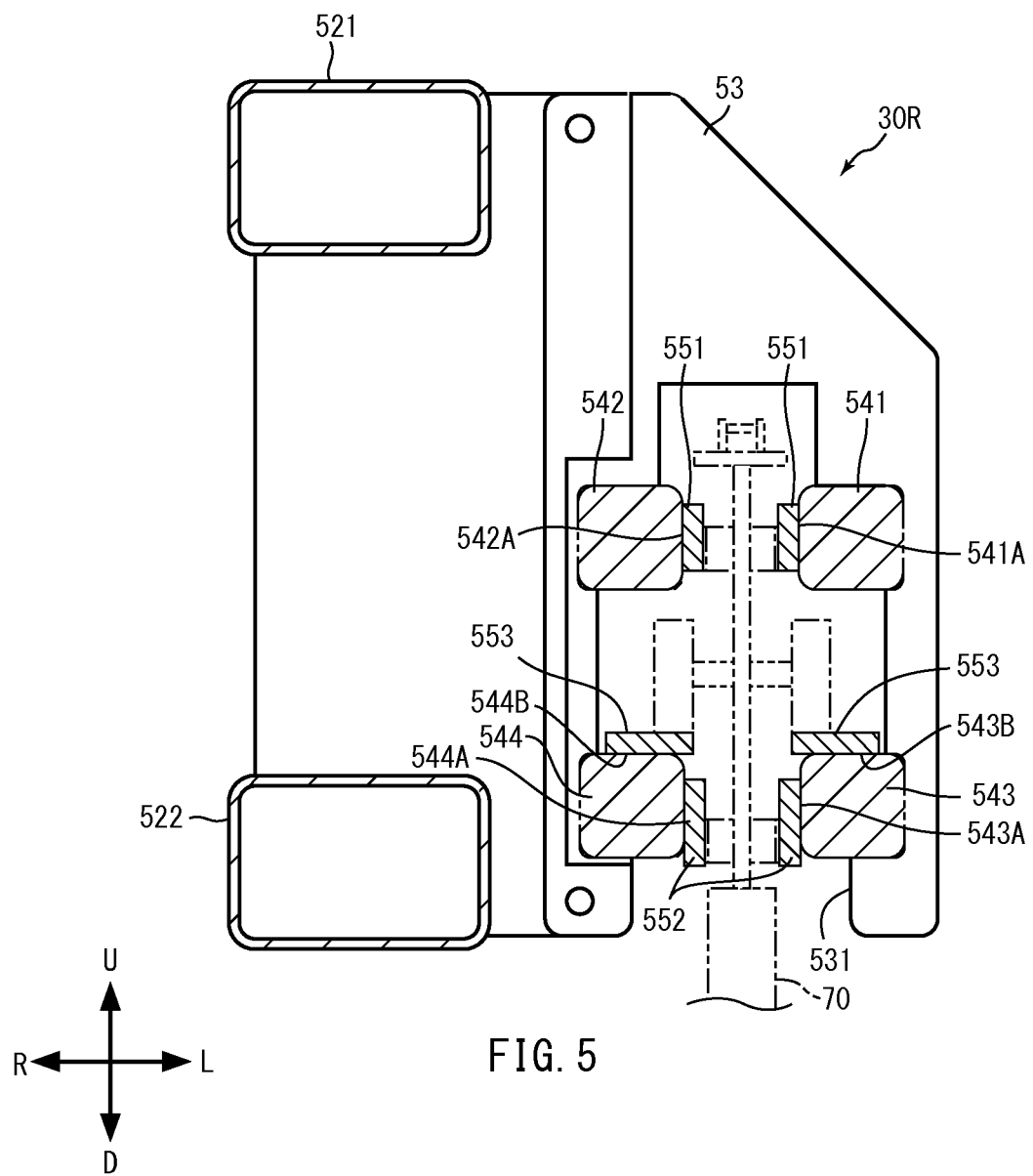
FIG. 5 is a front cross-sectional view of the right transport track portion, taken along line X-X of FIG. 4.

FIG. 5 is a front cross-sectional view of the right transport track portion 30R, taken along line X-X of FIG. 4. Arrow U indicates the upward with respect to the assembly/transport apparatus 100, and arrow D indicates the downward with respect to the assembly/transport apparatus 100. Arrow R indicates the right with respect to the assembly/transport apparatus 100, and arrow L indicates the left with respect to the assembly/transport apparatus 100.

In FIG. 5, a cross-section of the right transport track portion 30R is indicated by solid lines, and the associated carrier 70 portion on the right transport track portion 30R is indicated by phantom lines. The right transport track portion 30R includes the upper frame portion 521, lower frame portions 522 and brackets 53. The upper and lower frame portions 521 and 522 extend in the front/rear direction. The brackets 53 are fixed to the upper and lower frame portions 521 and 522. Each bracket 53 includes a recess 531. The recess 531 extends upward from the bottom of the bracket 53.

On the recess 531 are supported a first rail frame portion 541, a second rail frame portion 542, a third rail frame portion 543 and a fourth rail frame portion 544 that together constitute the rail frame 54. The first, second, third and fourth rail frame portions 541, 542, 543 and 544 extend in the front/rear direction.

A pair of first rails 551 are provided on the first and second rail frame portions 541 and 542. More specifically, the first rails 551 are provided on a first surface 541A and a second surface 542A that are opposite to each other.

A pair of second rails 552 are provided on the third and fourth rail frame portions 543 and 544, and a pair of third rails 553 are provided on the third and fourth rail frame portions 543 and 544. More specifically, the second rails 552 are provided on a third surface 543A and a fourth surface 544A that are opposite to each other. The third rails 553 are provided on the top surface 543B of the third rail frame portion 543 and the top surface 544B of the fourth rail frame portion 544.

While the construction of the right transport track portion 30R of the transport track 30 has been described with reference to FIG. 5, the left transport track portion 30L has a construction that is a mirror image of that of the right transport track portion 30R. The return track 40 has the same construction as the transport track 30. That is, the transport track 30 has rails extending in the transport direction, while the return track 40 has rails extending in the return direction. The construction of the first and second transfer devices 50 and 60 is the same as that of the transport track 30 except that these devices are supported on the associated up/down travelling devices 57. That is, the first transfer track 51 of the first transfer device 50 and the second transfer track 61 of the second transfer device 60 includes rails extending in the transport or return direction. A carrier 70 is movably supported on these rails. Thus, a carrier 70 moves along the rails of the transport track 30, return track 40, first transfer track 51 and second transfer track 61.

Figure 6:
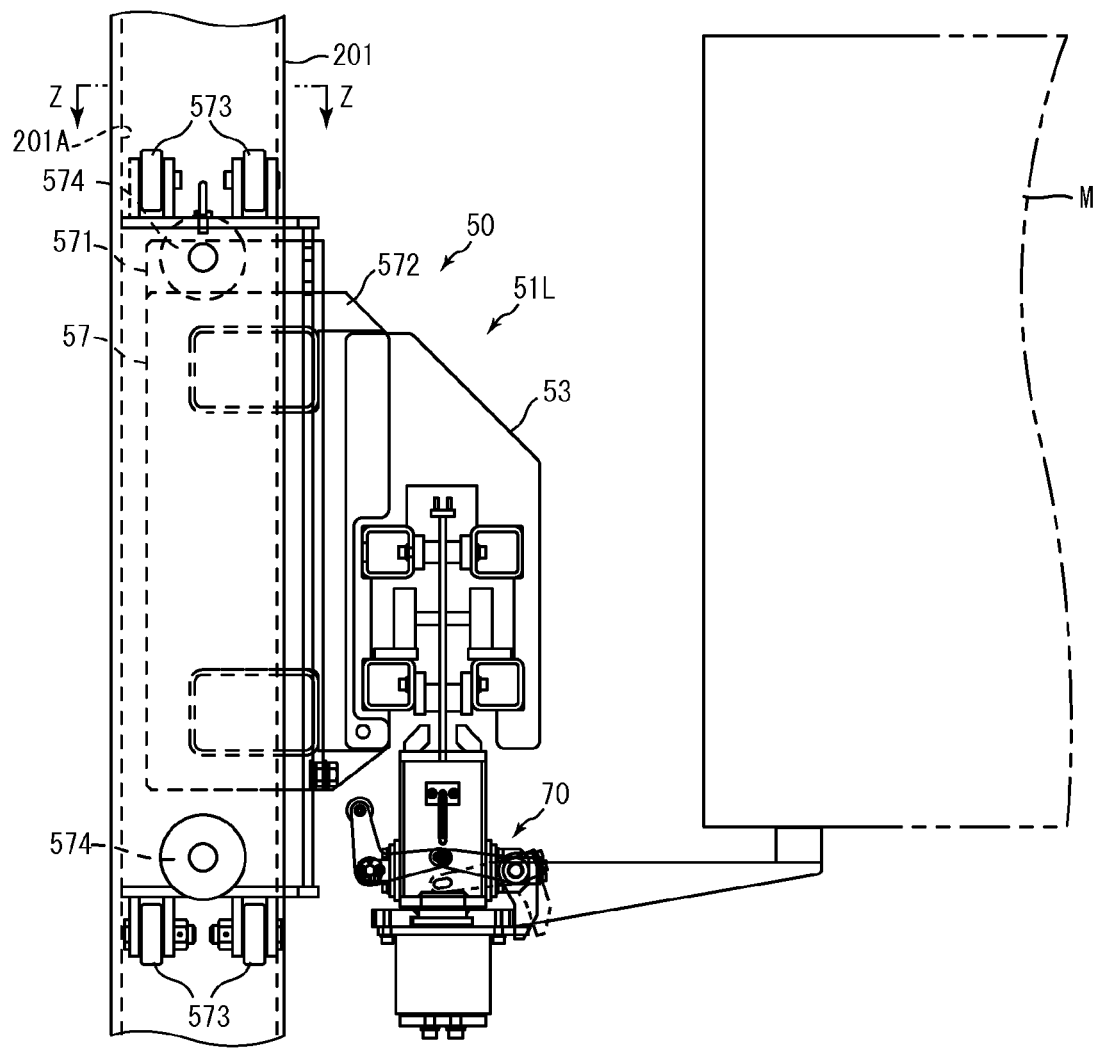
FIG. 6 is a rear view of the first transfer device 50, viewed in direction Y of FIG. 4.
Figure 6:
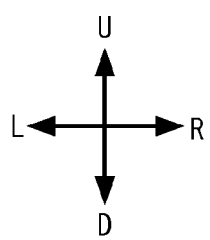

FIG. 6 is a rear view of the first transfer device 50 as viewed in direction Y of FIG. 4. Arrow U indicates the upward with respect to the assembly/transport apparatus 100, and arrow D indicates the downward with respect to the assembly/transport apparatus 100. Arrow R indicates the right with respect to the assembly/transport apparatus 100, and arrow L indicates the left with respect to the assembly/transport apparatus 100.

FIG. 6 shows the first left transfer track portion 51L that constitutes part of the first transfer device 50, and an up/down travelling device 57. The up/down travelling device 57 is configured to travel along the associated first vertical frame portion 201. The up/down travelling device 57 supports the first left transfer track portion 51L.

A travel space 201A in which the up/down travelling device 57 travels is defined inside the first vertical frame portion 201. The up/down travelling device 57 includes a travel frame 571 contained in the travel space 201A. The travel frame 571 supports the first left transfer track portion 51L via a bracket 572 (see FIG. 7).

A pair of guide rollers 573 are provided on each of the upper end and lower end of the travel frame 571. Each guide roller 573 is rotatably supported by a rotating shaft that extends in the left/right direction. A guide roller 574 is provided close to each of the upper end and lower end of the travel frame 571. Each guide roller 574 is rotatably supported by a rotating shaft that extends in the front/rear direction.

Figure 7:
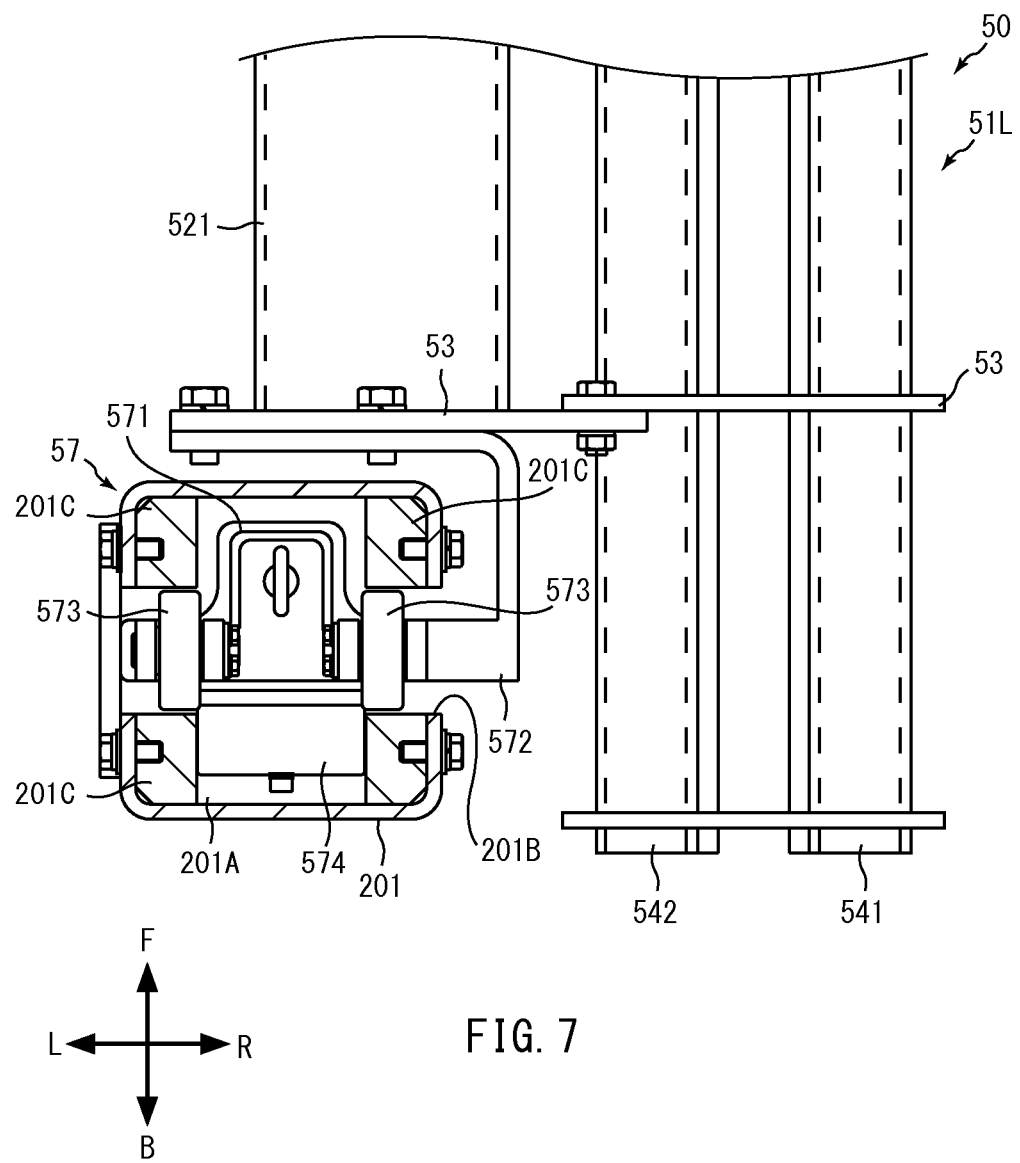
FIG. 7 is a horizontal cross-sectional view of the first vertical frame portion, taken on line Z-Z of FIG. 6.

FIG. 7 is a horizontal cross-sectional view of the first vertical frame portion 201, taken on line Z-Z of FIG. 6. Arrow F indicates the forward/front with respect to the assembly/transport apparatus 100, and arrow B indicates the rearward/back with respect to the assembly/transport apparatus 100. Arrow R indicates the right with respect to the assembly/transport apparatus 100, and arrow L indicates the left with respect to the assembly/transport apparatus 100.

FIG. 7 shows the first left transfer track portion 51L that constitutes part of the first transfer device 50, and an up/down travelling device 57. The up/down travelling device 57 is configured to travel along the associated first vertical frame portion 201. The up/down travelling device 57 supports the first left transfer track portion 51L.

The travel space 201A in which the up/down travelling device 57 travels is defined inside the first vertical frame portion 201. Inside the first vertical frame portion 201, a guide rail 201C is provided at each of the corners of the frame portion. The guide rails 201C guide the guide rollers 573 and 574 of the up/down travelling device 57. This allows the up/down travelling device 57 to move stably along the first vertical frame portion 201.

An opening 201B is formed on the right side of the first vertical frame portion 201. The opening 201B extends in the top/bottom direction. The bracket 572, which is connected with the travel frame 571, protrudes through the opening 201B toward the outside of the first vertical frame portion 201. The bracket 572 is connected with the bracket 53 for supporting the first left transfer track portion 51L.

[Carrier]

Figure 8:
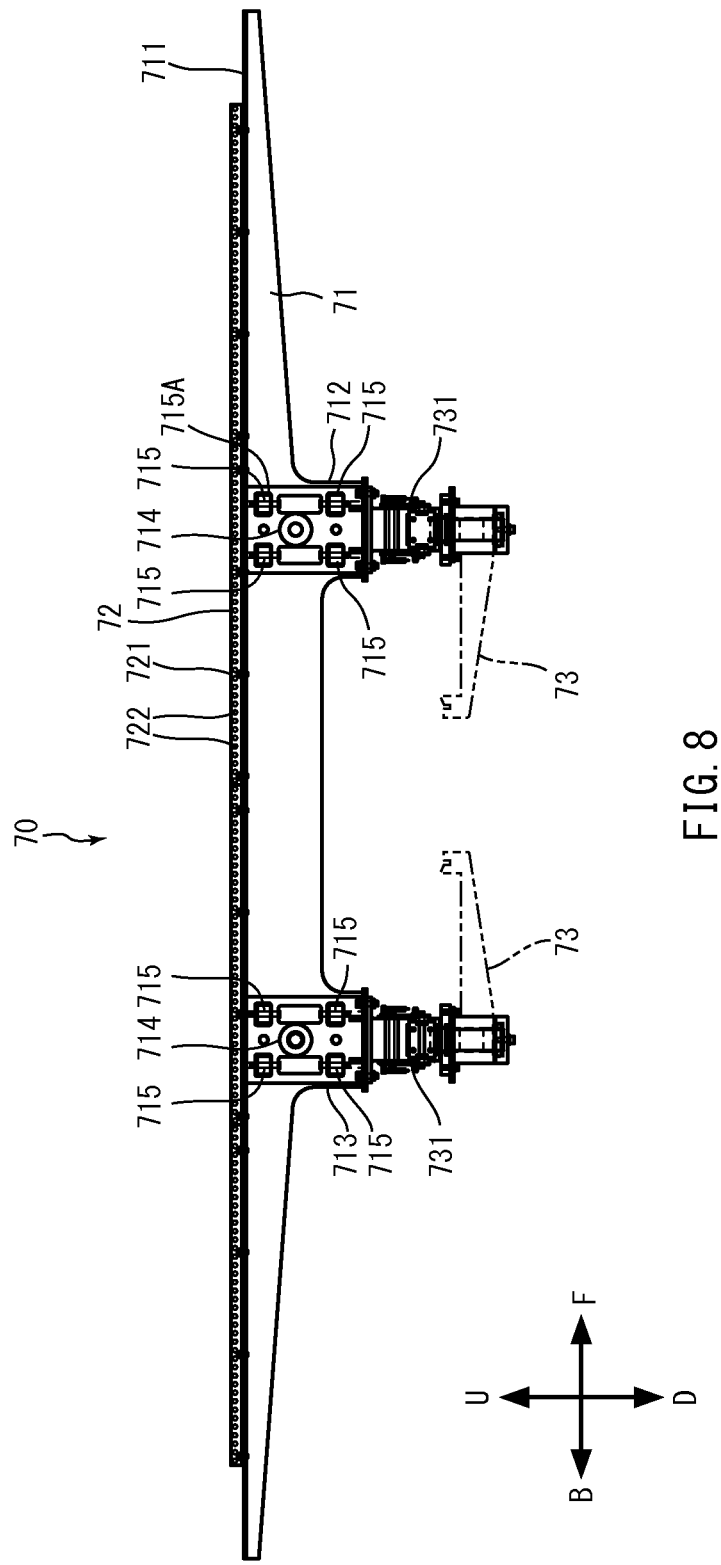
FIG. 8 is a side view of a carrier.

FIG. 8 is a side view of a carrier 70. Arrow U indicates the upward with respect to the carrier 70, and arrow D indicates the downward with respect to the carrier 70. Arrow F indicates the forward/front with respect to the carrier 70, and arrow B indicates the rearward/back with respect to the carrier 70. In this implementation, the front/rear direction of the carrier 70 is the direction in which the carrier 70 travels, i.e. the travel direction.

As shown in FIG. 8, each carrier 70 portion includes a carrier frame 71, a power receiving portion 72 and arms 73. The carrier frame 71 extends in the front/rear direction. A carrier rail 711 is provided on top of the carrier frame 71. The carrier rail 711 extends in the front/rear direction from the front end up to the rear end of the carrier frame 71. The power receiving portion 72 is located on top of the carrier rail 711. The power receiving portion 72 receives driving forces from the associated transport driving device 81, return driving device 82, first transfer driving device 83 and second transfer driving device 84. The length of the power receiving portion 72 in the front/rear direction is smaller than the length of the carrier rail 711 in the front/rear direction.

A roller support 712 is provided on the carrier frame 71 at a position that is forward of the center of the carrier frame in the front/rear direction. A roller support 713 is provided on the carrier frame 71 at a position that is rearward of the center of the carrier frame in the front/rear direction. Carrier rollers 714 are provided on the roller support 712. The carrier rollers 714 are supported on a rotating shaft that extends in the left/right direction. The carrier rollers 714 are located to the left and right so as to sandwich the roller support 712. A pair of carrier rollers 715 is provided above the carrier roller 714, and another pair of rollers is provided below it. The carrier rollers 715, four in total, are supported by rotating shafts extending in the top/bottom direction. The carrier rollers 715 are located in respective openings 715A formed in the roller support 712. Similar to the roller support 712, the roller support 713 also has carrier rollers 714 and 715 provided thereon.

An arm support 731 is provided below each of the roller supports 712 and 713. The arm supports 731 support the respective arms 73.

Figure 9:
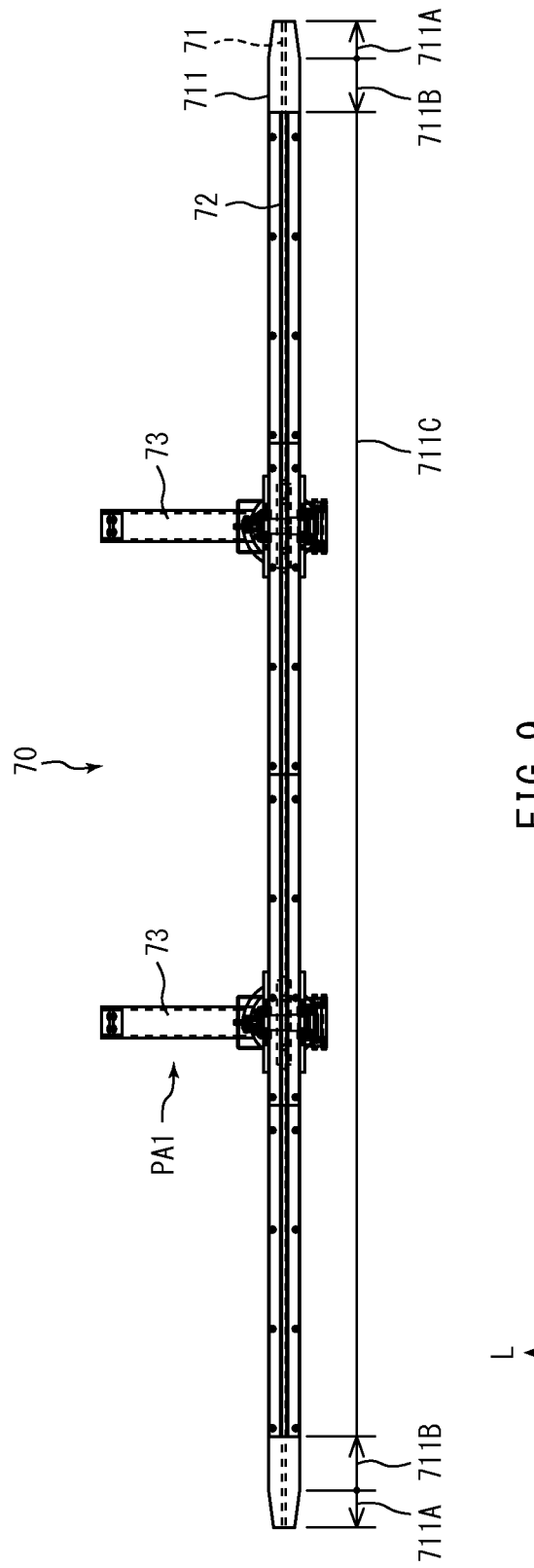
FIG. 9 is a plan view of a carrier portion.

FIG. 9 is a plan view of the carrier 70 portion. Arrow F indicates the forward/front with respect to the carrier 70 portion, and arrow B indicates the rearward/back with respect to the carrier 70 portion. Arrow R indicates the right with respect to the carrier 70 portion, and arrow L indicates the left with respect to the carrier 70 portion.

In FIG. 9, the top of the carrier 70 portion is visible. The power receiving portion 72 is provided on top of the carrier rail 711. A tapering portion 711A is formed on the front end and rear end of the carrier rail 711. Each tapering portion 711A is tapered so that its width, measured in the left/right direction, decreases as it goes toward the tip. Except the tapering portions 711A, the carrier rail 711 has a constant width in the left/right direction and has parallel left and right sides. The portions of the rail that have parallel left and right sides and on which the power receiving portion 72 is not present are referred to as first parallel portions 711B. The portion of the rail that has parallel left and right sides and on which the power receiving portion 72 is present is referred to as a second parallel portion 711C.

Figure 10:
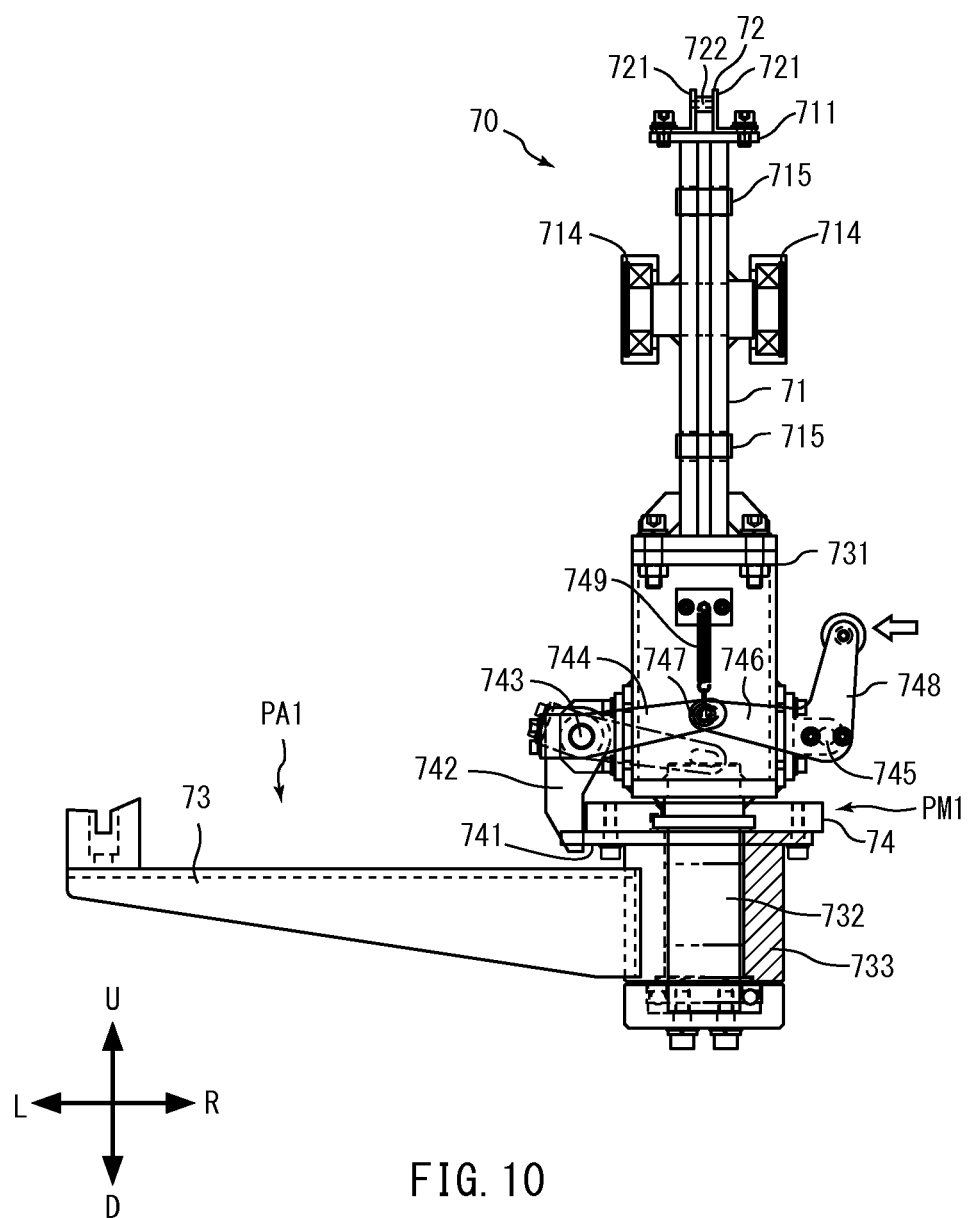
FIG. 10 is a front view of the carrier portion.

FIG. 10 is a front view of the carrier 70 portion. Arrow U indicates the upward with respect to the carrier 70 portion, and arrow D indicates the downward with respect to the carrier 70 portion. Arrow R indicates the right with respect to the carrier 70 portion, and arrow L indicates the left with respect to the carrier 70 portion.

As shown in FIG. 10, the carrier 70 portion includes the carrier frame 71, power receiving portion 72 and arms 73. The carrier rollers 714 and 715 are provided on the carrier frame 71. The carrier rail 711 is provided on top of the carrier frame 71. The power receiving portion 72 is provided on top of the carrier rail 711. The power receiving portion 72 includes brackets 721 and pins 722. A pair of brackets 721, to the left and right, are provided. The brackets 721 are spaced apart from each other in the left/right direction and fixed to the top of the carrier rail 711. The brackets 721 extend in the front/rear direction (see FIG. 8). A plurality of pins 722 are provided between the brackets 721. The axis of each pin 722 extends in the left/right direction. The pins 722 are disposed at a regular interval in the front/rear direction (see FIG. 8).

The arm supports 731 are provided below the carrier frame 71. For each arm support 731, a support shaft 732 extending downward is provided on the bottom of the arm support. A rotating member 733 is provided to the right of the associated arm 73. The rotating member 733 is rotatably supported on the support shaft 732. The arm 73 is connected with the rotating member 733. A transport object M can be mounted when the arm 73 protrudes in a direction perpendicular to the carrier frame 71. The position of the arm 73 that allows a transport object M to be mounted is referred to as first arm position PA1 (see FIG. 18). On the other hand, when the arm 73 is parallel to the carrier frame 71, it is withdrawn from a transport object M. The position of the arm 73 when withdrawn from a transport object M is referred to as second arm position PA2 (see FIG. 18). The arm 73 is rotatable between the first arm position PA1 and second arm position PA2.

A spur gear 74 that serves as an operated portion is provided on top of the rotating member 733. The spur gear 74 is rotatable between a first operated position PM1 that corresponds to the first arm position PA1 of the arm 73 and a second operated position PM2 that corresponds to the second arm position PA2 (see FIG. 18).

A protrusion 741 is provided below the spur gear 74. The protrusion 741 has notches that correspond to the first operated position PM1 and second operated position PM2 of the spur gear 74. The tip of a restricting arm 742 can engage with either one of the notches. The restricting arm 742 is rotatably supported on a shaft 743. A first operating arm 744 extends from the restricting arm 742 toward the right. To the right of the arm support 731, a second operating arm 746 is rotatably supported on a shaft 745. The second operating arm 746 and first operating arm 744 are connected by a shaft 747. A third operating arm 748 extends upward from the second operating arm 746. The shaft 747 is drawn upward by a spring 749. As the shaft 747 is drawn upward by the spring 749, the tip of the restricting arm 742 is pressed against the protrusion 741. When the tip of the restricting arm 742 engages with a notch in the protrusion 741, it restricts rotation of the arm 73. When the upper end of the third operating arm 748 is pushed toward the left in the drawing (i.e. direction of the hollow arrow), the shaft 747 moves in position downward against the force of the spring 749. Thus, the tip of the restricting arm 742 comes off the protrusion 741, allowing the arm 73 to be rotated.

[Driving Device]

Figure 11:
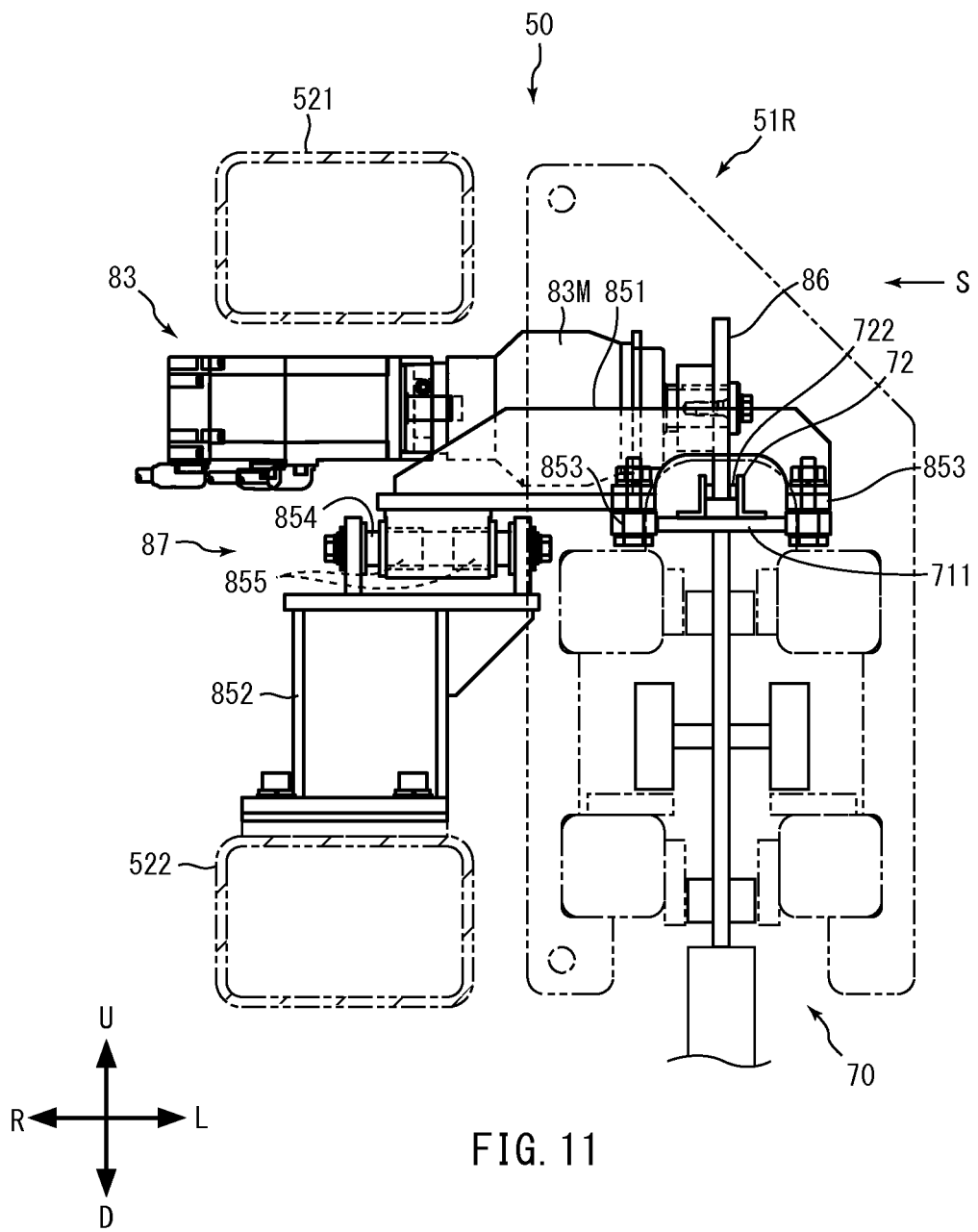
FIG. 11 is a front cross-sectional view of the first transfer device, taken on line Q-Q of FIG. 4.

FIG. 11 is a front cross-sectional view of the first transfer device 50, taken on line Q-Q of FIG. 4. Arrow U indicates the upward with respect to the assembly/transport apparatus 100, and arrow D indicates the downward with respect to the assembly/transport apparatus 100. Arrow R indicates the right with respect to the assembly/transport apparatus 100, and arrow L indicates the left with respect to the assembly/transport apparatus 100.

In FIG. 11, the first right transfer track portion 51R of the first transfer device 50, a first transfer driving device 83, and a carrier 70 portion are visible. The transport driving devices 81, return driving devices 82 and second transfer driving devices 84 have the same construction as the first transfer driving devices 83. The construction of a first transfer driving device 83 will be described below, and the transport driving devices 81, return driving devices 82 and second transfer driving devices 84 will not be described in detail.

The first transfer driving device 83 includes a first transfer driving source 83M. The first transfer driving source 83M is a servo motor, for example. The first transfer driving device 83 includes a gear 86 that serves as a transmission unit. The gear 86 is connected with the first transfer driving source 83M. The gear 86 rotates about an axis that is perpendicular to the travel direction of the carrier 70 portion. The gear 86 transmits a driving force from the first transfer driving source 83M to the power receiving portion 72 provided on top of the carrier 70 portion. More specifically, the gear 86 which is rotated by the first transfer driving source 83M successively engages with the pins 722 arranged in the front/rear direction on the power receiving portion 72, thereby causing the carrier 70 portion to travel in the transport direction TF and return direction TR. When the first transfer driving source 83M stops, the carrier 70 portion stops.

The first transfer driving source 83M is supported on the lower frame portion 522 via a first bracket 851 and a second bracket 852.

A pair of guide rollers 853 are provided on the first bracket 851 and located forward of the gear 86. The distance between the guide rollers 853 corresponds to the width of the carrier rail 711 of the carrier 70 portion measured in the left/right direction. The guide rollers 853 guide the power receiving portion 72 of the carrier 70 portion from a state in which it is separated from the gear 86 to a state in which it is in contact with the gear 86. Similar to the guide rollers 853 located forward of the gear 86, a pair of guide rollers 853 are provided rearward of the gear (see FIG. 13). The carrier 70 portion is guided so as to be positioned between the guide rollers 853 located forward and rearward of the gear 86. The guide rollers 853 are positioned such that the gear 86 engages with a pin 722 of the power receiving portion 72 when the carrier rail 711 of the carrier 70 portion is located between the guide rollers 853.

The second bracket 852 is fixed to the lower frame portion 522. The first bracket 851 is not fixed to the second bracket 852 but is supported so as to be movable in the left/right direction. More specifically, the second bracket 852 includes support shafts 854 that extend in the left/right direction. Cylinders 855 movable in the left/right direction relative to the respective support shafts 854 are fixed to the first bracket 851. Each of the cylinders 855 is movably fitted to the outside of the associated support shaft 854. Thus, the first transfer driving source 83M and gear 86 are movable in the left/right direction relative to the first right transfer track portion 51R.

Figure 12:
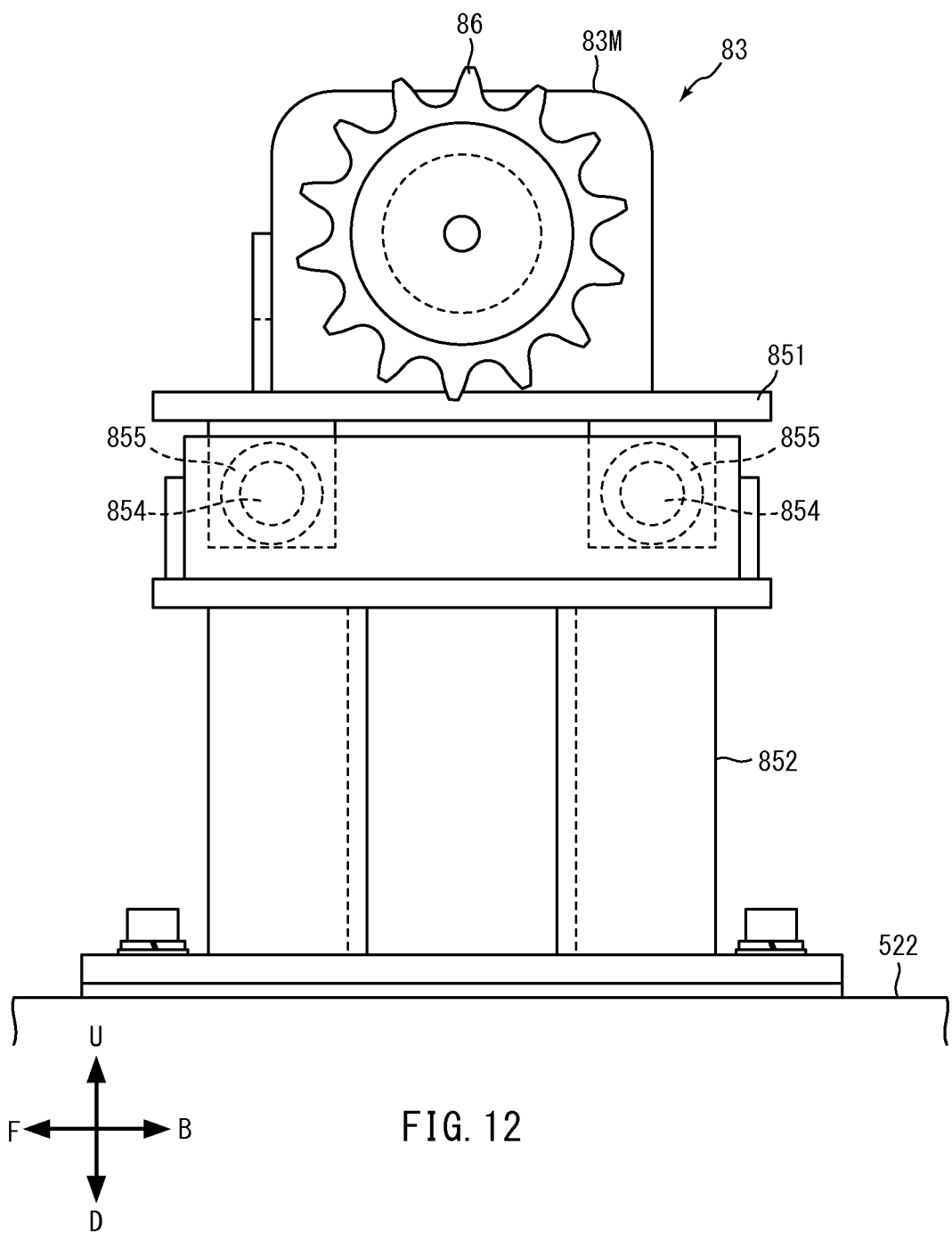
FIG. 12 is a left side view of the first transfer driving device viewed in direction S of FIG. 11.

FIG. 12 is a left side view of the first transfer driving device 83 viewed in direction S of FIG. 11. Arrow U indicates the upward with respect to the first transfer driving device 83, and arrow D indicates the downward with respect to the first transfer driving device 83. Arrow F indicates the forward/front with respect to the first transfer driving device 83, and arrow B indicates the rearward/back with respect to the first transfer driving device 83.

The first transfer driving device 83 includes the first transfer driving source 83M. The first transfer driving source 83M includes the gear 86 that serves as a transmission unit. The gear 86 is configured to engage with a pin 722 provided on the power receiving portion 72 of the carrier 70 portion.

The second bracket 852 is fixed to the lower frame portion 522. The second bracket 852 includes the support shafts 854 extending in the left/right direction. The cylinders 855 that are movable in the left/right direction relative to the respective support shafts 854 are fixed to the bracket 851. Each of the cylinders 855 is moveably fitted to the outside of the associated support shaft 854. Thus, the first transfer driving source 83M and gear 86 are movable in the left/right direction relative to the first right transfer track portion 51R.

Figure 13:
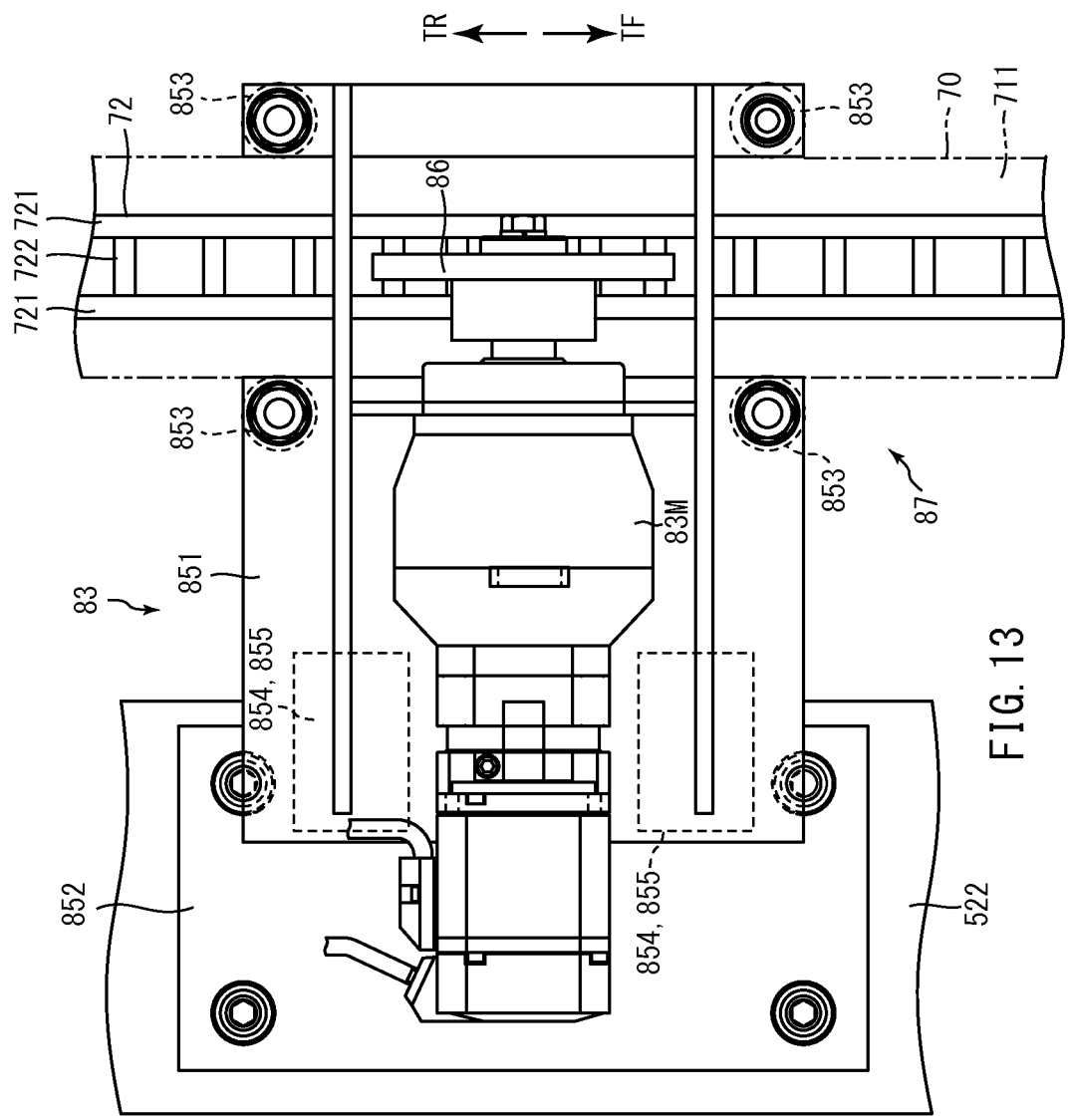
FIG. 13 is a plan view of the first transfer driving device.
Figure 13:
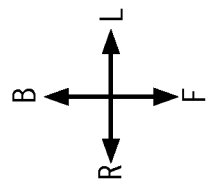

FIG. 13 is a plan view of the first transfer driving device 83. Arrow F indicates the forward/front with respect to the first transfer driving device 83, and arrow B indicates the rearward/back with respect to the first transfer driving device 83. Arrow R indicates the right with respect to the first transfer driving device 83, and arrow L indicates the left with respect to the first transfer driving device 83.

The first transfer driving source 83M includes the gear 86 that serves as a transmission unit. The gear 86 transmits a driving force from the first transfer driving source 83M to the power receiving portion 72 provided on top of the carrier 70 portion. More specifically, the gear 86 that is rotated by the first transfer driving source 83M successively engages with the pins 722 provided on the power receiving portion 72 to cause the carrier 70 portion to travel in the transport direction TF or return direction TR. When the first transfer driving source 83M stops, the carrier 70 portion also stops.

The first transfer driving source 83M is supported on the lower frame portion 522 via the first bracket 851 and second bracket 852. The first and second brackets 851 and 852 constitute part of a guiding device 87.

On the first bracket 851 are provided two pairs of guide rollers 853, one pair being located forward of the gear 86 and the other one being located rearward of it. The distance between the guide rollers 853 depends on the width of the carrier rail 711 of the carrier 70 portion measured in the left/right direction. As the carrier rail 711 of the carrier 70 portion is located between the guide rollers 853, the gear 86 engages with a pin 722 on the power receiving portion 72.

The second bracket 852 is fixed to the lower frame portion 522. The first bracket 851 is not fixed to the second bracket 852 but is supported by the support shafts 854 and cylinders 855. The support shafts 854 and cylinders 855 constitute a position changing mechanism 88. The first transfer driving source 83M and gear 86 are movable in the left/right direction relative to the first right transfer track portion 51R.

Figure 14:
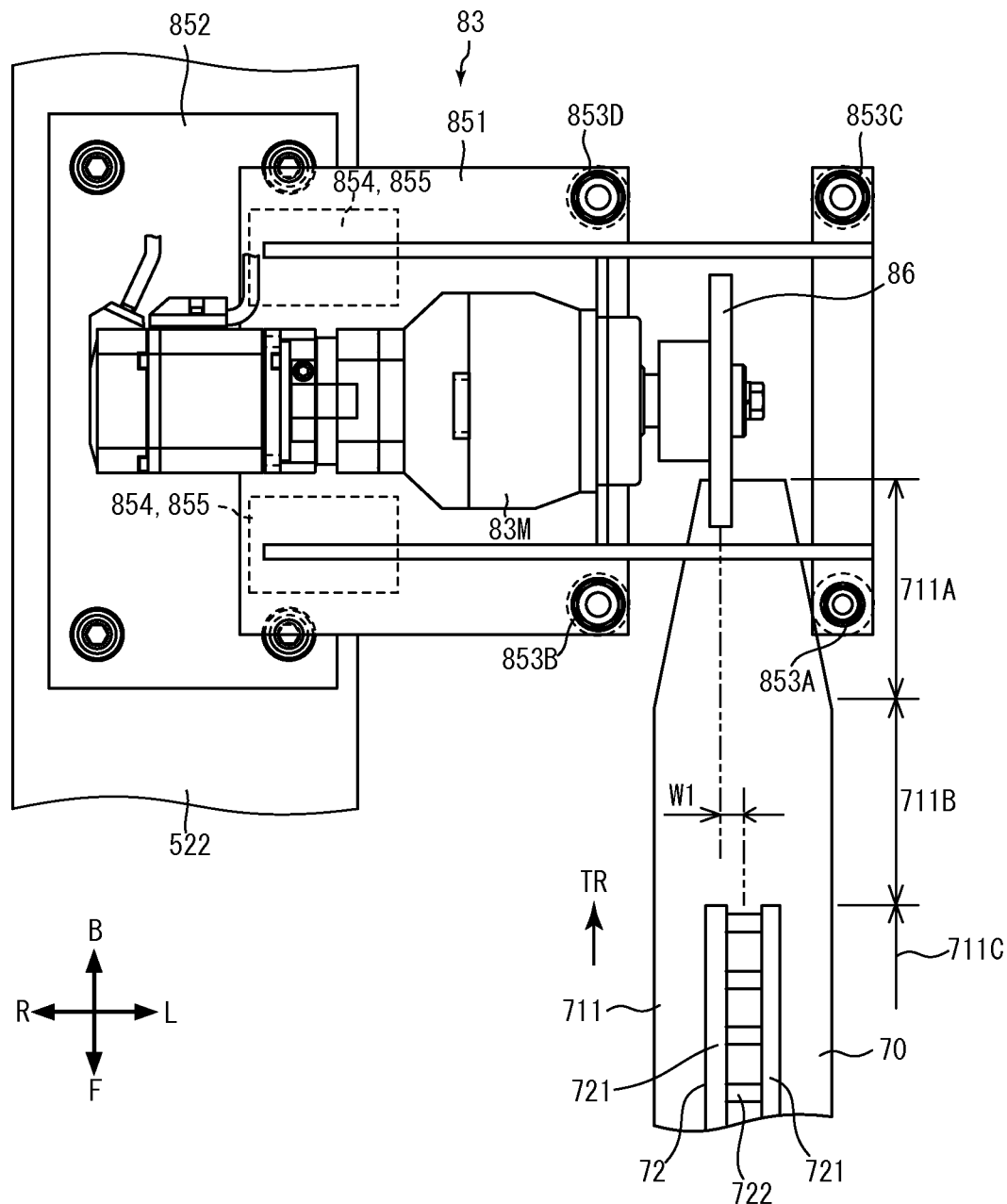
FIG. 14 is a plan view of the first transfer driving device into which a carrier is travelling.
Figure 15:
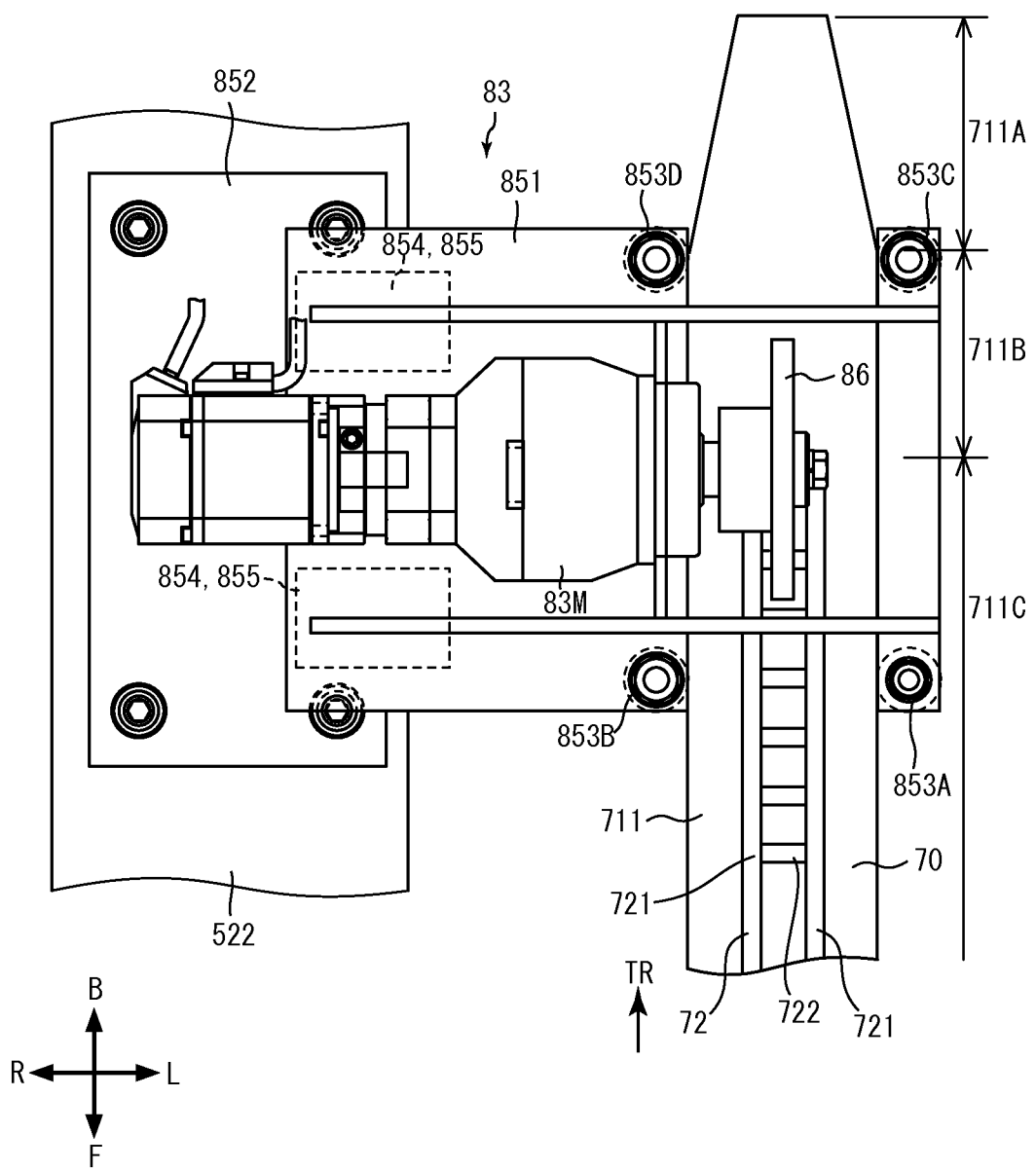
FIG. 15 is a plan view of the first transfer driving device into which the carrier has travelled and the gear engages with the power receiving portion.

FIG. 14 is a plan view of the first transfer driving device 83 into which a carrier 70 portion is travelling. FIG. 15 is a plan view of the first transfer driving device 83 into which the carrier 70 portion has travelled and the gear 86 engages with the power receiving portion 72. Arrow F indicates the forward/front with respect to the first transfer driving device 83, and arrow B indicates the rearward/back with respect to the first transfer driving device 83. Arrow R indicates the right with respect to the first transfer driving device 83, and arrow L indicates the left with respect to the first transfer driving device 83.

FIG. 14 shows the carrier 70 portion being moved into the first transfer driving device 83. It is supposed that the carrier 70 portion is travelling in the return direction TR. The power receiving portion 72 of the carrier 70 portion and the gear 86 of the first transfer driving source 83M are not yet engaged. In FIG. 14, the power receiving portion 72 of the carrier 70 portion is displaced from the gear 86 of the first transfer driving source 83M by W1 to the left. The associated tapering portion 711A of the carrier rail 711 is only in contact with a guide roller 853A, located to the left. Starting from this state, when the carrier 70 portion travels in the return direction TR, this guide roller 853A is pushed by the tapering portion 711A toward the left. As the guide roller 853A is pushed by the tapering portion 711A to the left, the first bracket 851 and first transfer driving source 83M move toward the left relative to the second bracket 852. As the first transfer driving source 83M moves toward the left, the position of the gear 86 changes to be aligned with the power receiving portion 72 of the carrier 70 portion.

In FIG. 15, the carrier 70 portion has travelled further in the return direction TR relative to its position in FIG. 14. The tapering portion 711A of the carrier rail 711 has passed through the area between the guide rollers 853C and 853D, and the associated first parallel portion 711B of the carrier rail 711 has reached the area between the guide rollers 853C and 853D. The second parallel portion 711C of the carrier rail 711 is located between the guide rollers 853A and 853B. The length of the first parallel portion 711B measured in the front/rear direction is such that the gear 86 engages with the power receiving portion 72 when the first and second parallel portions 711B and 711C of the carrier rail 711 has been guided to be located between the guide rollers 853A, 853B, 853C and 853D. Thus, the position of the gear 86 changes to be more exactly aligned with the power receiving portion 72 of the carrier 70 portion.

[Positional Relationship between Driving Devices and Carrier]

Figure 16:
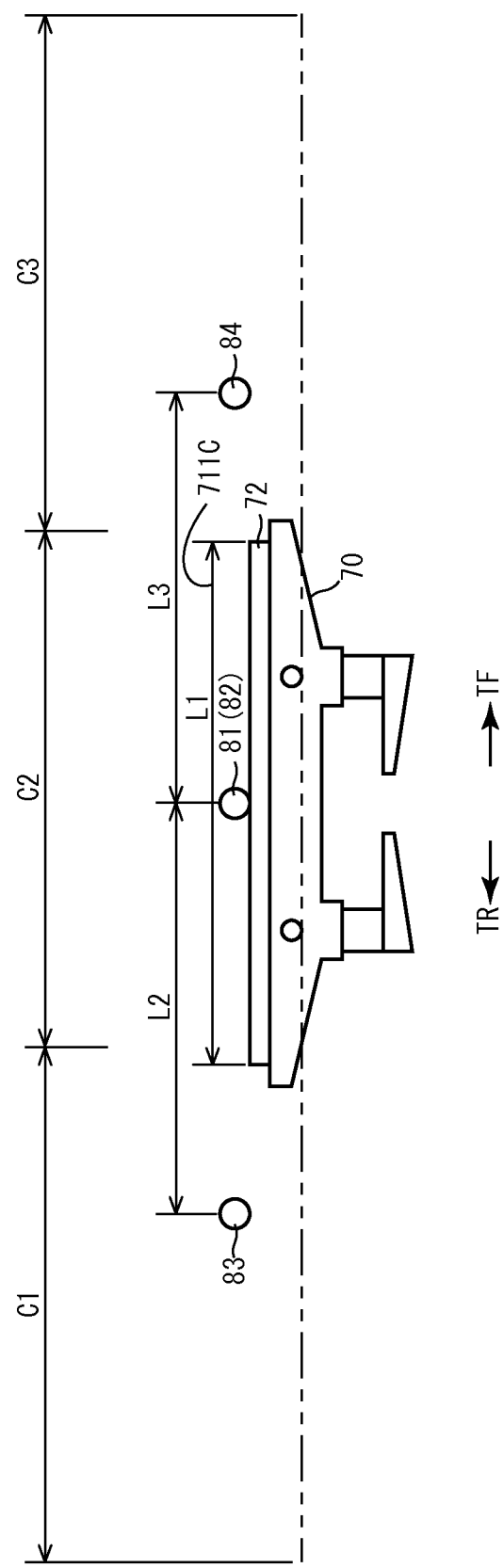
FIG. 16 is a simplified diagram illustrating the positional relationship between the first transfer driving device, second transfer driving device, transport driving device and return driving device.

FIG. 16 is a simplified diagram illustrating the positional relationship between a transport driving device 81, return driving device 82, first transfer driving device 83 and second transfer driving device 84. In FIG. 16, L1 is the length of the power receiving portion 72 of the carrier 70 portion; L2 is the distance between the first transfer driving device 83 and the transport driving device 81 or return driving device 82; and L3 is the distance between the second transfer driving device 84 and the transport driving device 81 or return driving device 82. L1 is greater than L2. L1 is greater than L3. In FIG. 16, the transport driving device 81 (or return driving device 82) is in contact with the power receiving portion 72 of the carrier 70 portion. If the carrier 70 portion travels in the transport direction TF starting from the state shown in FIG. 16, the power receiving portion 72 of the carrier 70 portion comes off the transport driving device 81 (or return driving device 82) after the second transfer driving device 84 contacts the power receiving portion 72 of the carrier 70 portion. If the carrier 70 portion travels in the return direction TR starting from the state shown in FIG. 16, the power receiving portion 72 of the carrier 70 portion comes off the transport driving device 81 (or return driving device 82) after the first transfer driving device 83 contacts the power receiving portion 72 of the carrier 70 portion. That is, at least one of the first transfer driving device 83, second transfer driving device 84 and transport driving device 81 (or return driving device 82) is in contact with the carrier 70 portion. Thus, a driving force can always be transmitted to the carrier 70 portion.

[Arm Operating Unit]

Figure 17:
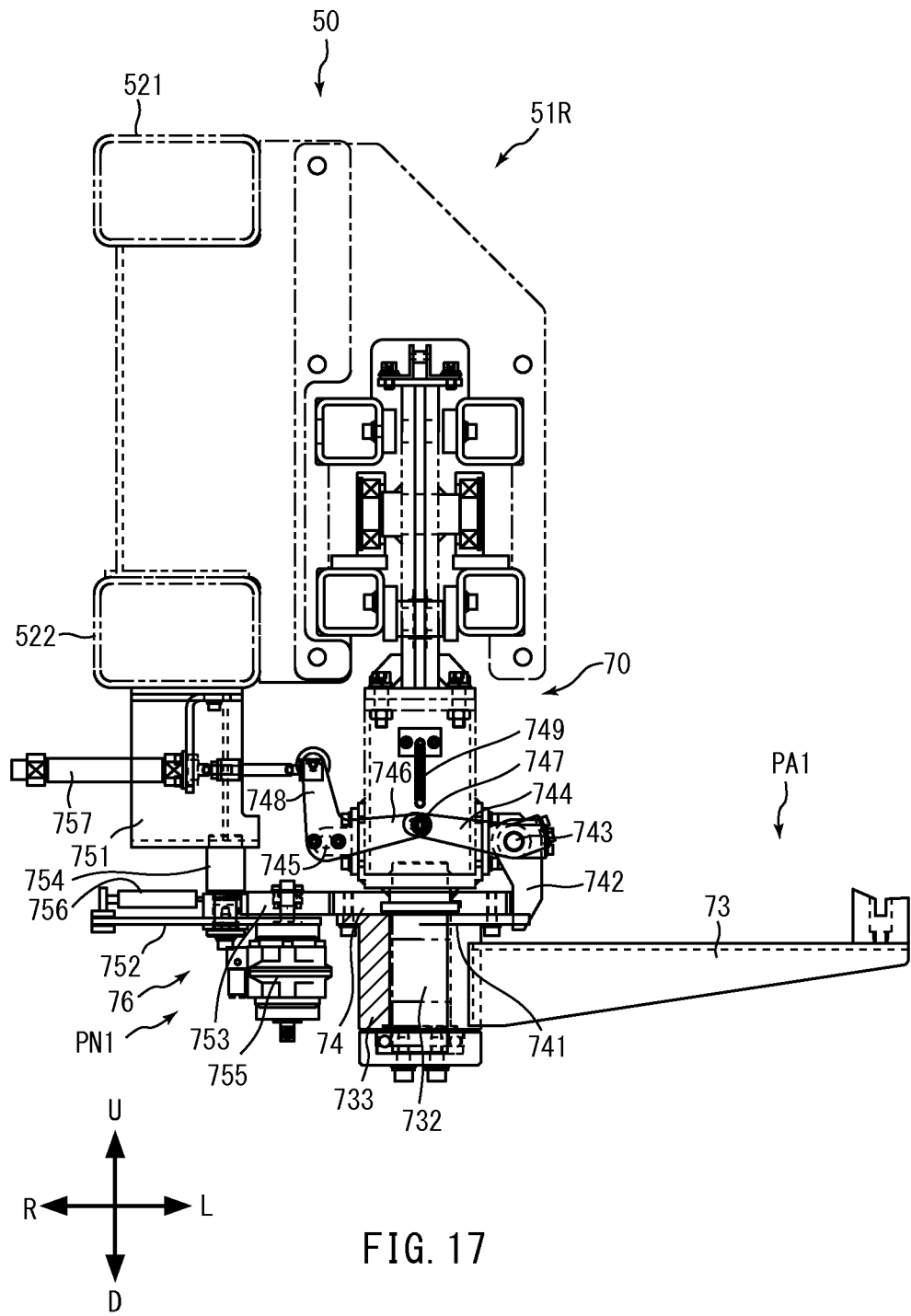
FIG. 17 is a front cross-sectional view of the first transfer device, taken on line T-T of FIG. 4.

FIG. 17 is a front cross-sectional view of the first transfer device 50, taken on line T-T of FIG. 4. Arrow U indicates the upward with respect to the assembly/transport apparatus 100, and arrow D indicates the downward with respect to the assembly/transport apparatus 100. Arrow R indicates the right with respect to the assembly/transport apparatus 100, and arrow L indicates the left with respect to the assembly/transport apparatus 100.

In FIG. 17, the first right transfer track portion 51R of the first transfer device 50, an arm operating unit 76, and a carrier 70 portion are visible. The arm operating units 76 are provided on the first and second transfer devices 50 and 60.

The arm operating unit 76 shown includes a bracket 751, a support arm 752 and a spur gear 753 that serves as an operating unit. The bracket 751 is fixed to the lower frame portion 522. The support arm 752 is rotatably supported on a support shaft 754 via the bracket 751. A rotation driving unit 755 is mounted on the support arm 752. The spur gear 753 is mounted on the rotation driving unit 755. A first actuator 756 is connected with the support arm 752. Operating the first actuator 756 rotates the support arm 752, thereby moving the spur gear 753 in position.

In FIG. 17, the spur gear 753 engages with the spur gear 74 provided on the carrier 70 portion. This position is referred to as connected position PN1. The first actuator 756 may be operated to rotate the support arm 752 so as to withdraw the spur gear 753 from the spur gear 74. The position of the spur gear 753 withdrawn from the spur gear 74 is referred to as withdrawn position PN2.

A second actuator 757 capable of advancing and withdrawing a rod is provided on the bracket 751. The first actuator 756 may be operated to cause the spur gear 753 to engage with the spur gear 74 of the carrier 70 portion (connected position PN1), and then the second actuator 757 may be operated to push the upper end of the third operating arm 748 toward the left as designated in the drawing such that the tip of the restricting arm 742 comes off the protrusion 741 and thus the arm 73 becomes rotatable. Then, the rotation driving unit 755 may be operated to rotate the spur gear 753, thereby moving the arm 73 between the first arm position PA1 and the second arm position PA2 (see FIG. 18).

Figure 18:
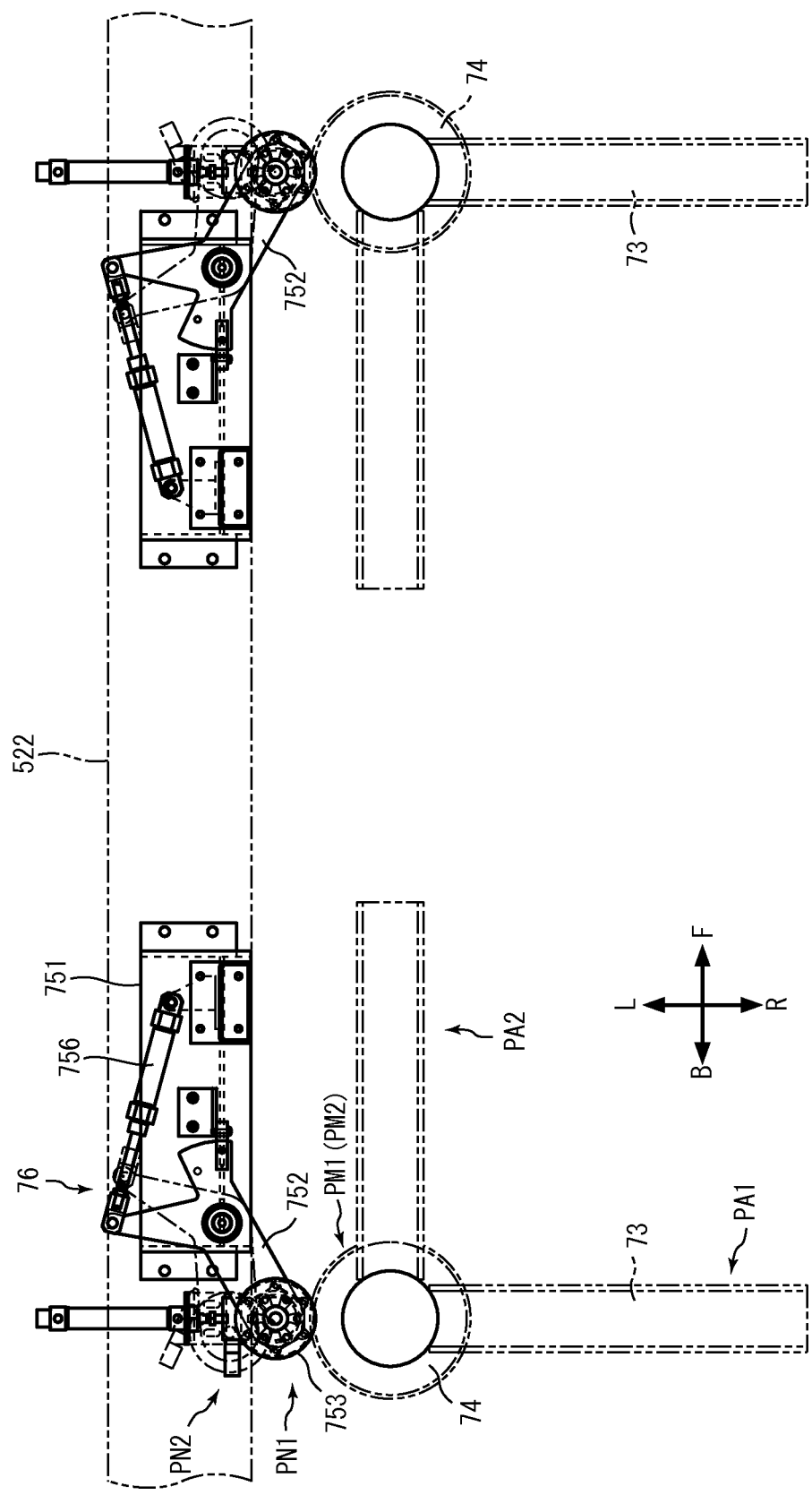
FIG. 18 is a plan view of the first left transfer track portion of FIG. 2.

FIG. 18 is a plan view of the first left transfer track portion 51L of FIG. 2. Arrow F indicates the forward/front with respect to the assembly/transport apparatus 100, and arrow B indicates the rearward/back with respect to the assembly/transport apparatus 100. Arrow R indicates the right with respect to the assembly/transport apparatus 100, and arrow L indicates the left with respect to the assembly/transport apparatus 100.

In FIG. 18, the arm operating unit 76 of the first left transfer track portion 51L is indicated by solid lines, and the lower frame portion 522 is indicated by two-dot chain lines. The arms 73 and spur gears 74 of the carrier 70 portion are indicated by two-dot chain lines.

As shown in FIG. 18, operating the first actuators 756 to rotate the support arms 752 moves the spur gears 753 between the connected position PN1, at which they engage with the respective spur gears 74, and the withdrawn position PN2, at which they are withdrawn from the respective spur gears 74.

When the spur gears 753 engage with the respective spur gears 74, i.e. at the connected position PN1, the spur gears 753 may be rotated to move the arms 73 between the first arm position PA1 and the second arm position PA2.

[Operation of Assembly/Transport Apparatus]

The operation of the assembly/transport apparatus 100 will now be described. FIGS. 19 to 27 are right side views of the assembly/transport apparatus 100. Arrow U indicates the upward with respect to the assembly/transport apparatus 100, and arrow D indicates the downward with respect to the assembly/transport apparatus 100. Arrow F indicates the forward/front with respect to the assembly/transport apparatus 100, and arrow B indicates the rearward/back with respect to the assembly/transport apparatus 100. For ease of explanation, each of FIGS. 19 to 27 only shows one carrier 70. The operation of the assembly/transport apparatus 100 is controlled by a control unit, not shown.

Figure 19:
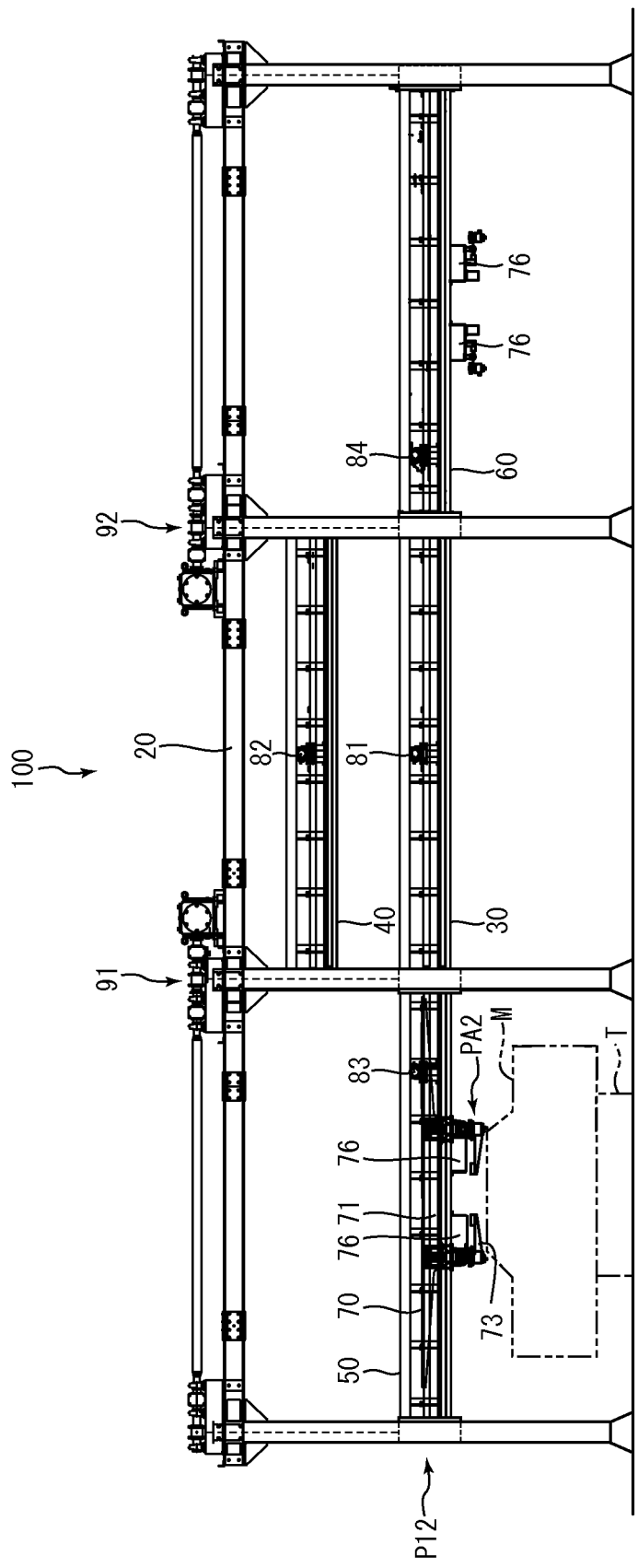
FIG. 19 is a right side view of the assembly/transport apparatus.

FIG. 19 shows the first transfer device 50 located in the first transport position P12. The left and right carrier 70 portions are stationary on the first transfer device 50. The arms 73 are in the second arm position PA2, in which they are parallel to the carrier frames 71. A transport object M has been supplied by a transport carrier T to below the first transfer device 50.

Figure 20:
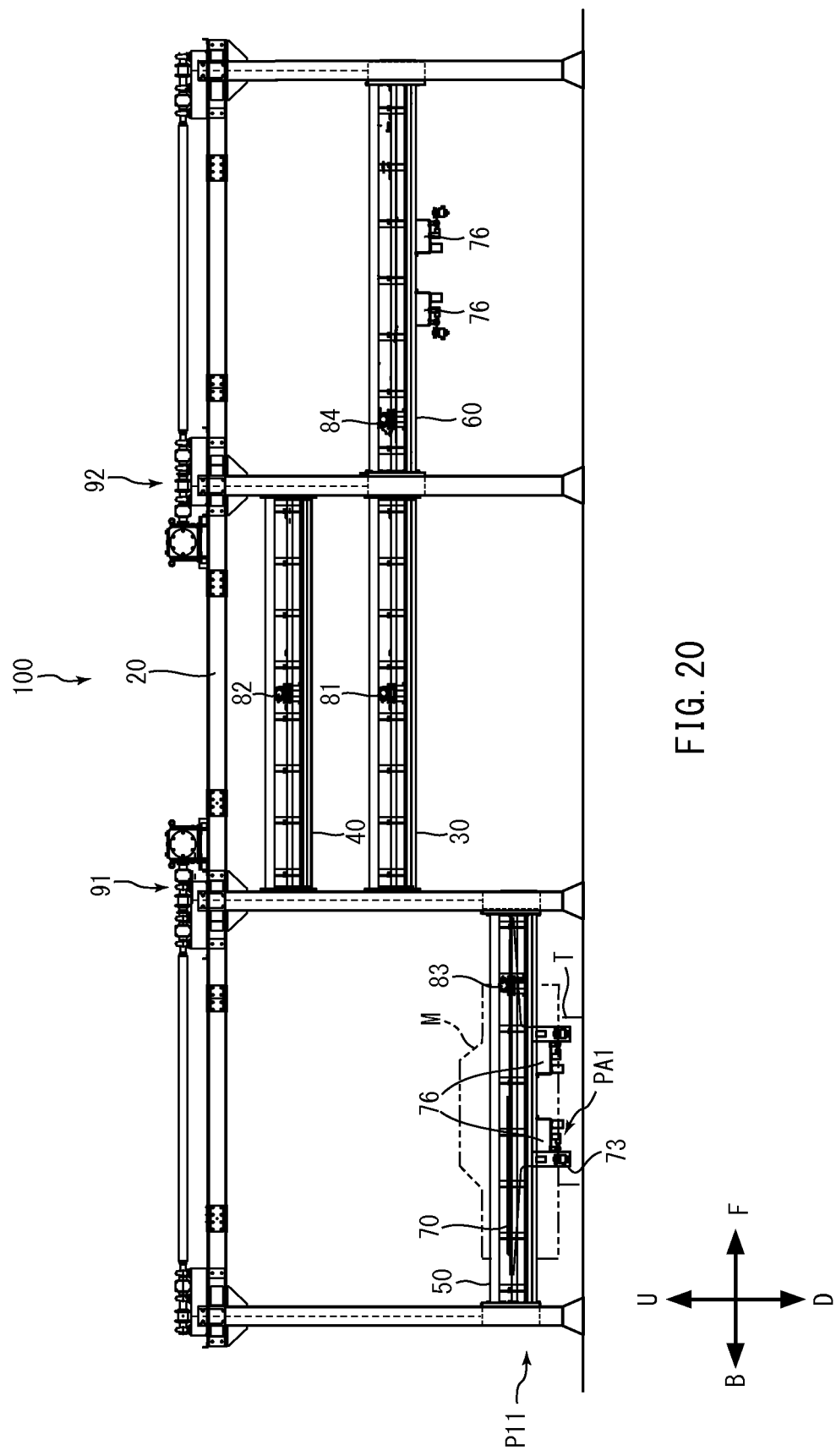
FIG. 20 is a right side view of the assembly/transport apparatus.

In FIG. 20, the first hoisting device 91 has been operated to lower the first transfer device 50 to the mount position P11. The arm operating units 76 have been operated to move the arms 73 from the second arm position PA2 to the first arm position PA1 As the arms 73 are in the first arm position PA1, the transport object M can be mounted on the left and right carrier 70 portions.

Figure 21:
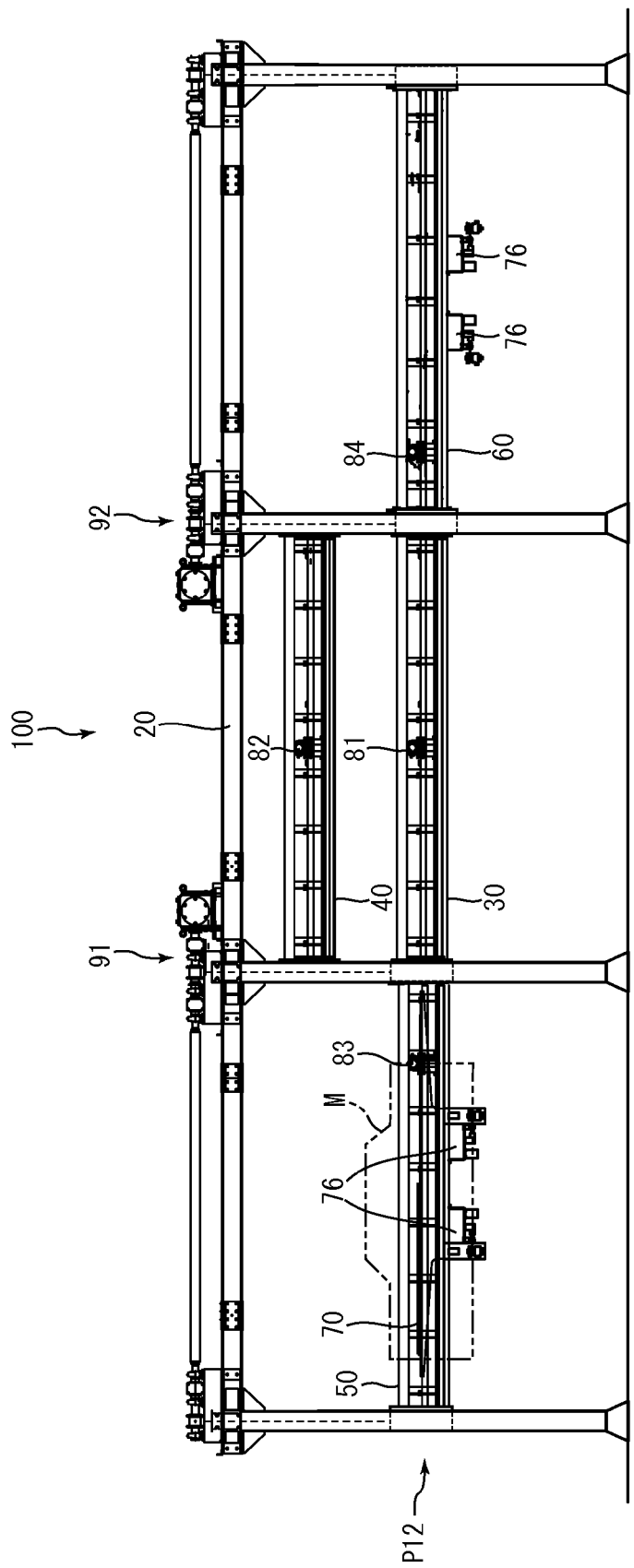
FIG. 21 is a right side view of the assembly/transport apparatus.

In FIG. 21, the first hoisting device 91 has been operated to raise the first transfer device 50 from the mount position P11 to the first transport position P12. In this state, predetermined work, such as mounting of parts, may be done on the transport object M. The position of the first transfer device 50 during this work is not limited to the first transport position P12. The position of the first transfer device 50 can be adapted to the type of the work.

In FIG. 21, the first transfer track 51 of the first transfer device 50 is connected with the starting end 30S of the transport track 30. Thus, the transport object M mounted on the left and right carrier 70 portions can be moved from the first transfer device 50 to the transport track 30 (see FIG. 22). The left and right carrier 70 portions are moved as they are driven by the first transfer driving devices 83 of the first transfer device 50 and the transport driving devices 81 of the transport track 30 working together. More specifically, when the carrier 70 is located on the first transfer device 50, the carrier 70 is moved by the first transfer driving devices 83 toward the transport track 30. When the front portion of the carrier 70 has reached the transport driving devices 81, the carrier 70 is moved by the first transfer driving devices 83 and transport driving devices 81. When the rear portion of the carrier 70 has left the first transfer driving devices 83, the carrier 70 is moved by the transport driving devices 81. When the carrier 70 has arrived at the predetermined transport stop position SF, the transport driving devices 81 stop to stop the carrier 70 at the predetermined transport stop position SF. The left and right carrier 70 portions are moved from the first transfer device 50 to the transport track 30 in a synchronized manner. The control unit (not shown) controls the first transfer driving devices 83 and transport driving devices 81 located to the left and right with respect to the assembly/transport apparatus 100 to operate in a synchronized manner.

Figure 22:
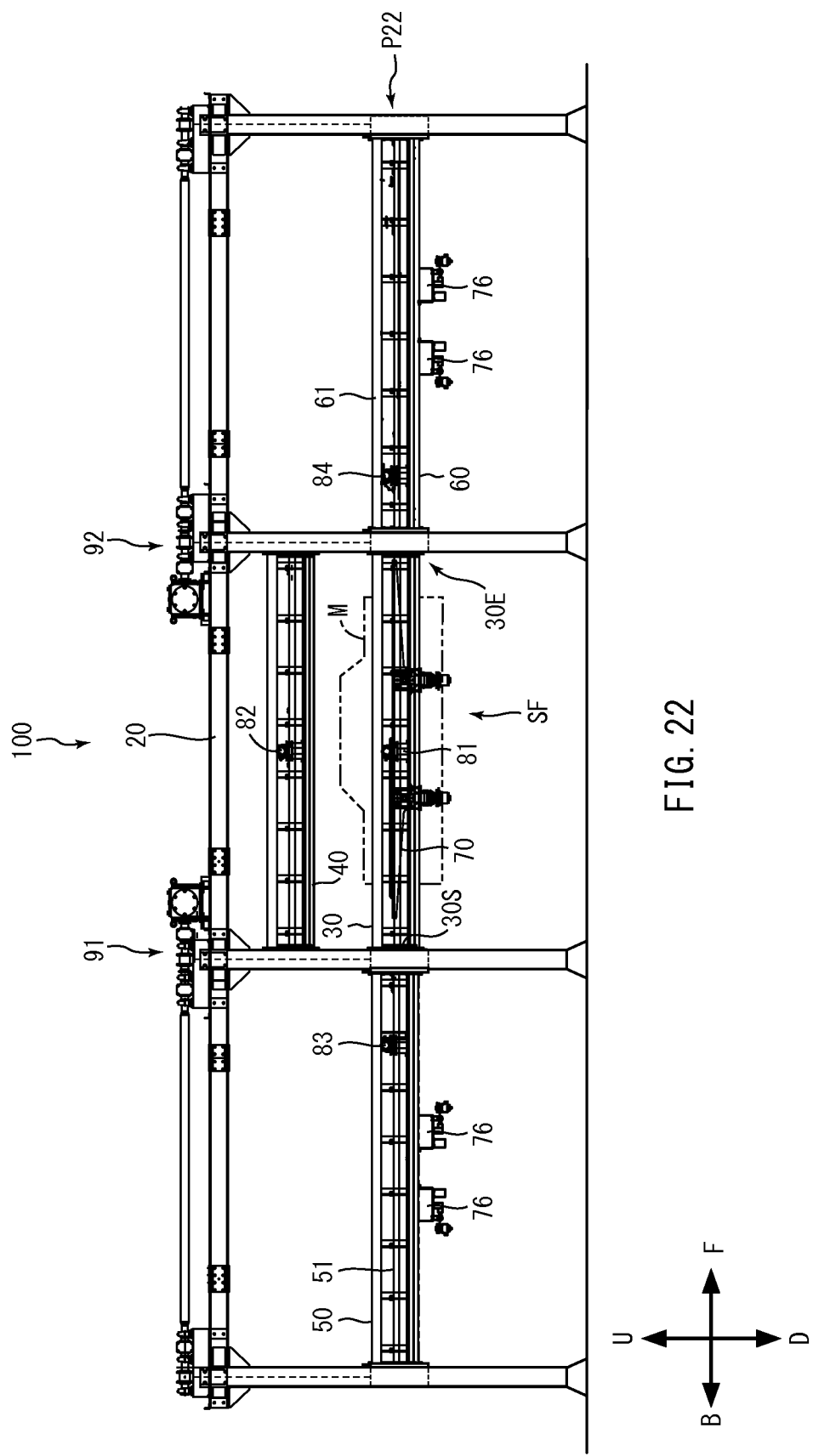
FIG. 22 is a right side view of the assembly/transport apparatus.

In FIG. 22, the transport object M mounted on the carrier 70 is stationary at the predetermined transport stop position SF. In this state, predetermined work, such as mounting of parts, can be done on the transport object M.

In FIG. 22, the second transfer device 60 is located in the second transport position P22. The second transfer track 61 of the second transfer device 60 is connected with the terminating end 30E of the transfer track 30. Thus, the transport object M mounted on the left and right carrier 70 portions can be moved from the transport track 30 to the second transfer device 60 (see FIG. 23). The left and right carrier 70 portions are moved as they are driven by the transport driving devices 81 of the transport track 30 and the second transfer driving devices 84 of the second transfer device 60 working together. More specifically, when the carrier 70 is located on the transport track 30, the carrier 70 is moved by the transport driving devices 81 toward the second transfer device 60. When the front portion of the carrier 70 has reached the second transfer driving devices 84, the carrier 70 is moved by the transport driving devices 81 and the second transfer driving devices 84. When the rear portion of the carrier 70 has left the transport driving devices 81, the carrier 70 is moved by the second transfer driving devices 84. When the carrier 70 has arrived at the second transfer device 60, the second transfer driving devices 84 stop, and the carrier 70 stops on the second transfer device 60. The left and right carrier 70 portions are moved from the transport track 30 to the second transfer device 60 in a synchronized manner. The control unit (not shown) controls the transport driving devices 81 and second transfer driving devices 84 located to the left and right with respect to the assembly/transport apparatus 100 to operate in a synchronized manner.

Figure 23:
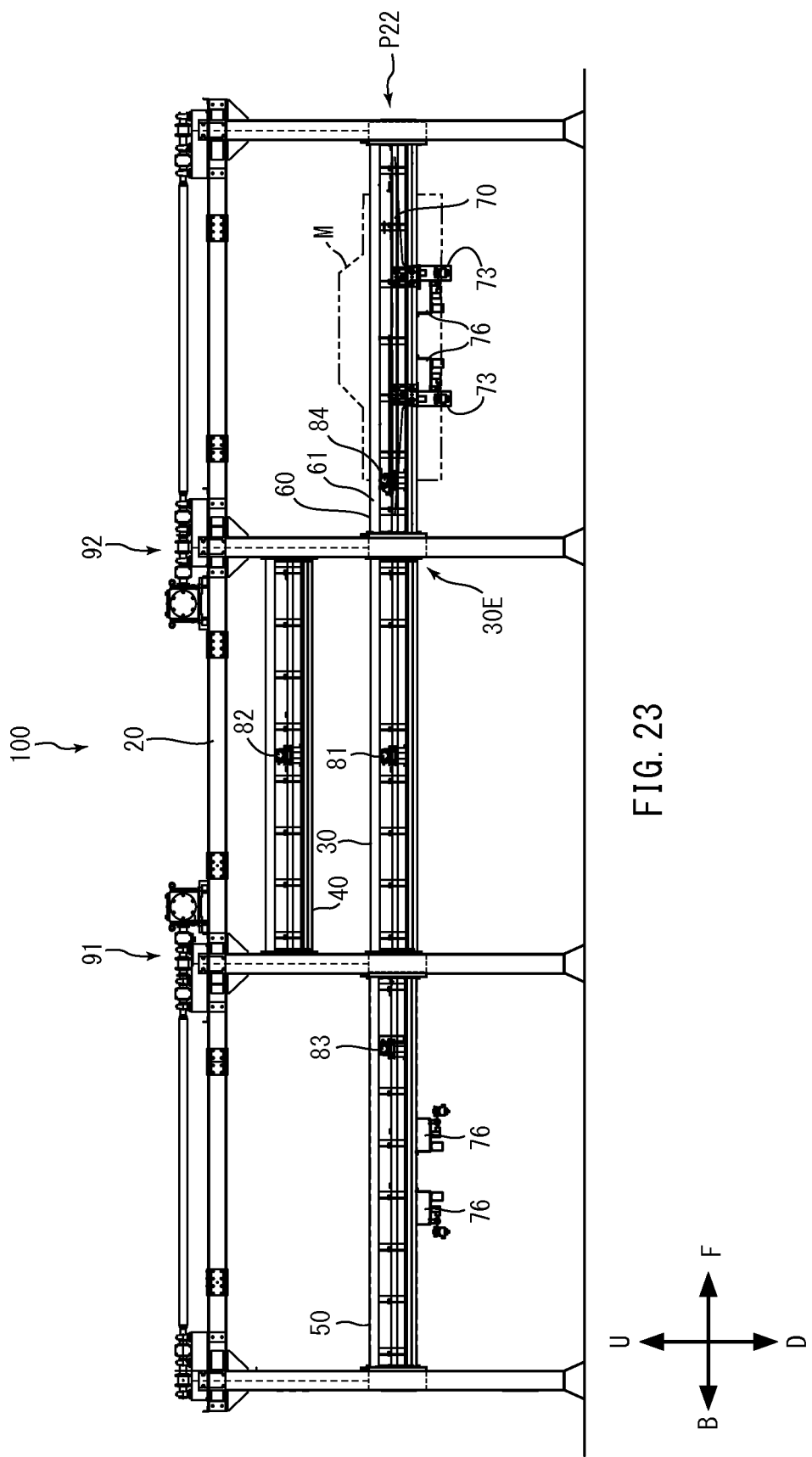
FIG. 23 is a right side view of the assembly/transport apparatus.

In FIG. 23, the second transfer device 60 is located in the second transport position P22. The transport object M mounted on the carrier 70 is stationary on the second transfer device 60. In this state, predetermined work, such as mounting of parts, can be done on the transport object M. The position of the second transfer device 60 during this work is not limited to the second transport position P22. The position of the second transfer device 60 can be adapted to the type of the work.

Figure 24:
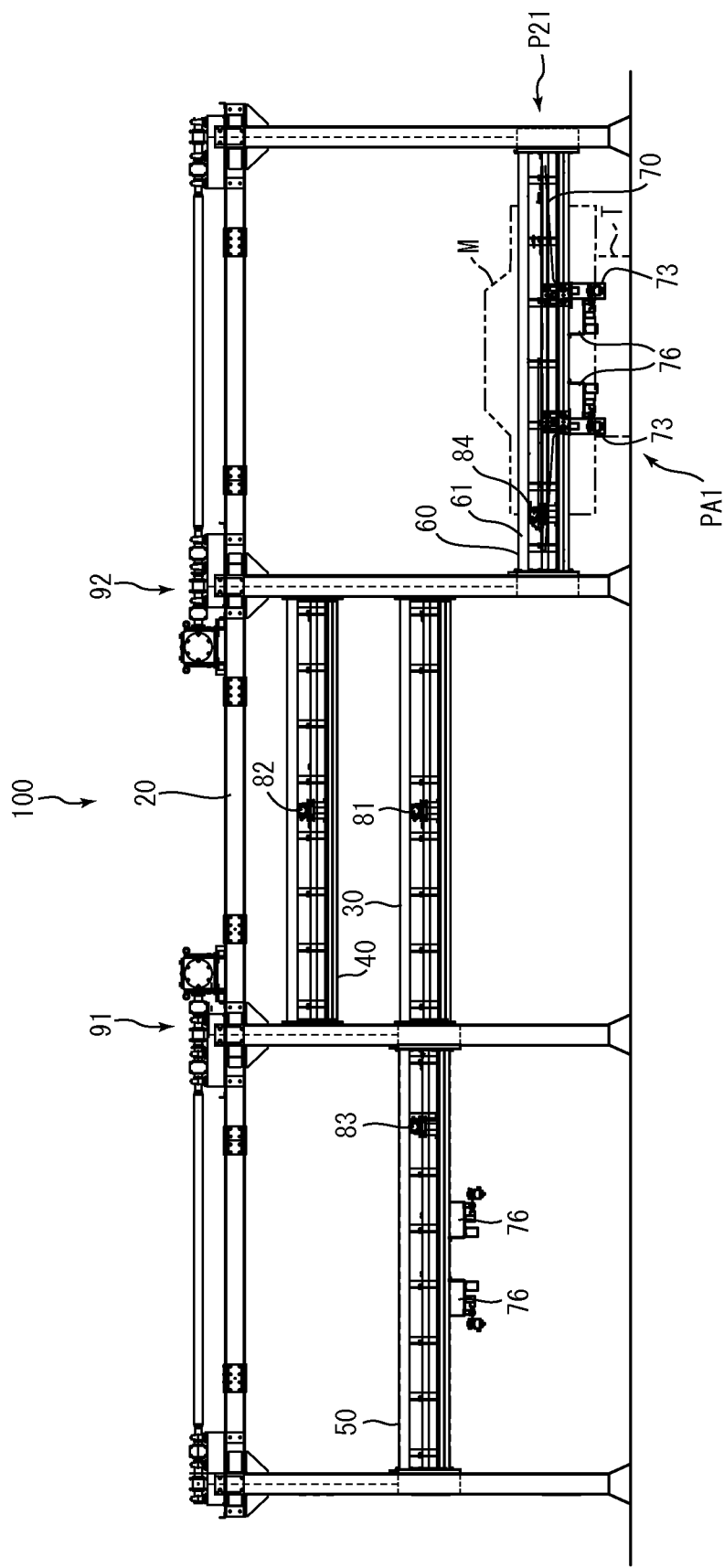
FIG. 24 is a right side view of the assembly/transport apparatus.

In FIG. 24, the second hoisting device 92 has been operated to lower the second transfer device 60 from the second transport position P22 to the removal position P21. The transport object M is mounted on top of a transport carrier T. The arm operating unit 76 is operated to move the arms 73 from the first arm position PA1 to the second arm position PA2. When the arms 73 are parallel to the carrier frames 71, the transport object M can be removed from the carrier 70.

In FIG. 25, the empty carrier 70, from which the transport object M has been removed, is stationary on the second transfer device 60. The second hoisting device 92 has been operated to raise the second transfer device 60 from the removal position P21 to the second return position P23. The second transfer track 61 of the second transfer device 60 is connected with the starting end 40S of the return track 40. Thus, the left and right carrier 70 portions can be moved from the second transfer device 60 to the return track 40 (see FIG. 26). The left and right carrier 70 portions are moved as they are driven by the second transfer driving devices 84 of the second transfer device 60 and the return driving devices 82 of the return track 40 working together. More specifically, when the carrier 70 is located on the second transfer device 60, the carrier 70 is moved by the second transfer driving devices 84 toward the return track 40. When the front portion of the carrier 70 has reached the return driving devices 82, the carrier 70 is moved by the second transfer driving devices 84 and return driving devices 82. When the rear portion of the carrier 70 has left the second transfer driving devices 84, the carrier 70 is moved by the return driving devices 82. When the carrier 70 has arrived at the predetermined return stop position SR on the return track 40, the return driving device 82 stops, and the carrier 70 stops at the return stop position SR on the return track 40. The left and right carrier 70 portions are moved from the second transfer device 60 to the return track 40 in a synchronized manner. The control unit (not shown) controls the second transfer driving devices 84 and return driving devices 82 located to the left and right with respect to the assembly/transport apparatus 100 to operate in a synchronized manner.

Figure 26:
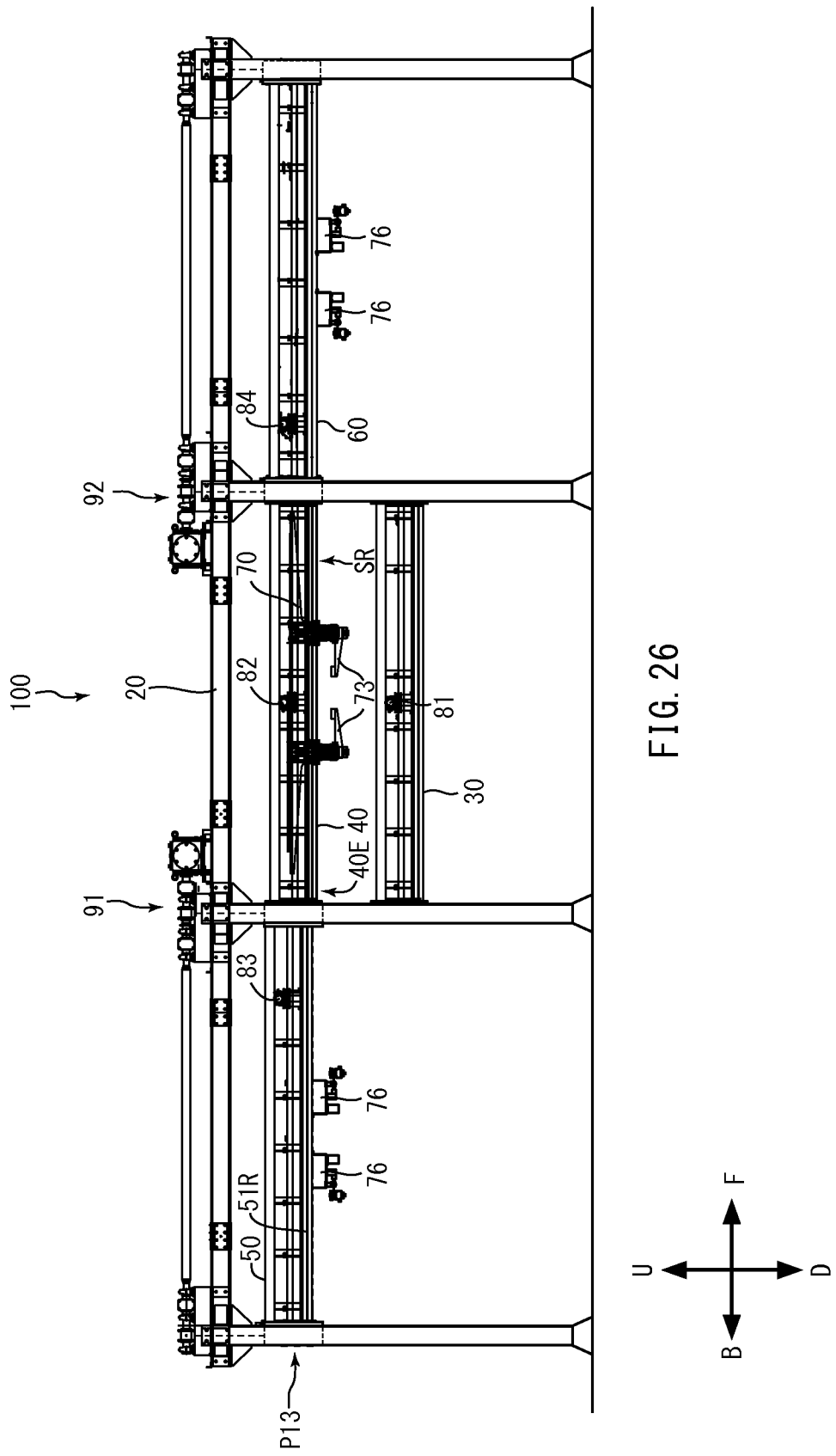
FIG. 26 is a right side view of the assembly/transport apparatus.

In FIG. 26, the empty carrier 70 is stationary on the return track 40. The first transfer device 50 is located in the first return position P13. The first transfer track 51 of the first transfer device 50 is connected with the terminating end 40E of the return track 40. Thus, the left and right carrier 70 portions can be moved from the return track 40 to the first transfer device 50 (see FIG. 27). The left and right carrier 70 portions are moved as they are driven by the return driving devices 82 of the return track 40 and the first transfer driving devices 83 of the first transfer device 50 working together. More specifically, when the carrier 70 is located on the return track 40, the carrier 70 is moved by the return driving devices 82 toward the first transfer device 50. When the front portion of the carrier 70 has reached the first transfer driving devices 83, the carrier 70 is moved by the return driving devices 82 and first transfer driving devices 83. When the rear portion of the carrier 70 has left the return driving devices 82, the carrier 70 is moved by the first transfer driving devices 83. When the carrier 70 has arrived at the first transfer device 50, the first transfer driving devices 83 stop, and the carrier 70 stops on the return track 40. The left and right carrier 70 portions are moved from the return track 40 to the first transfer device 50 in a synchronized manner. The control unit (not shown) controls the return driving devices 82 and first transfer driving devices 83 located to the left and right with respect to the assembly/transport apparatus 100 to operate in a synchronized manner.

Figure 27:
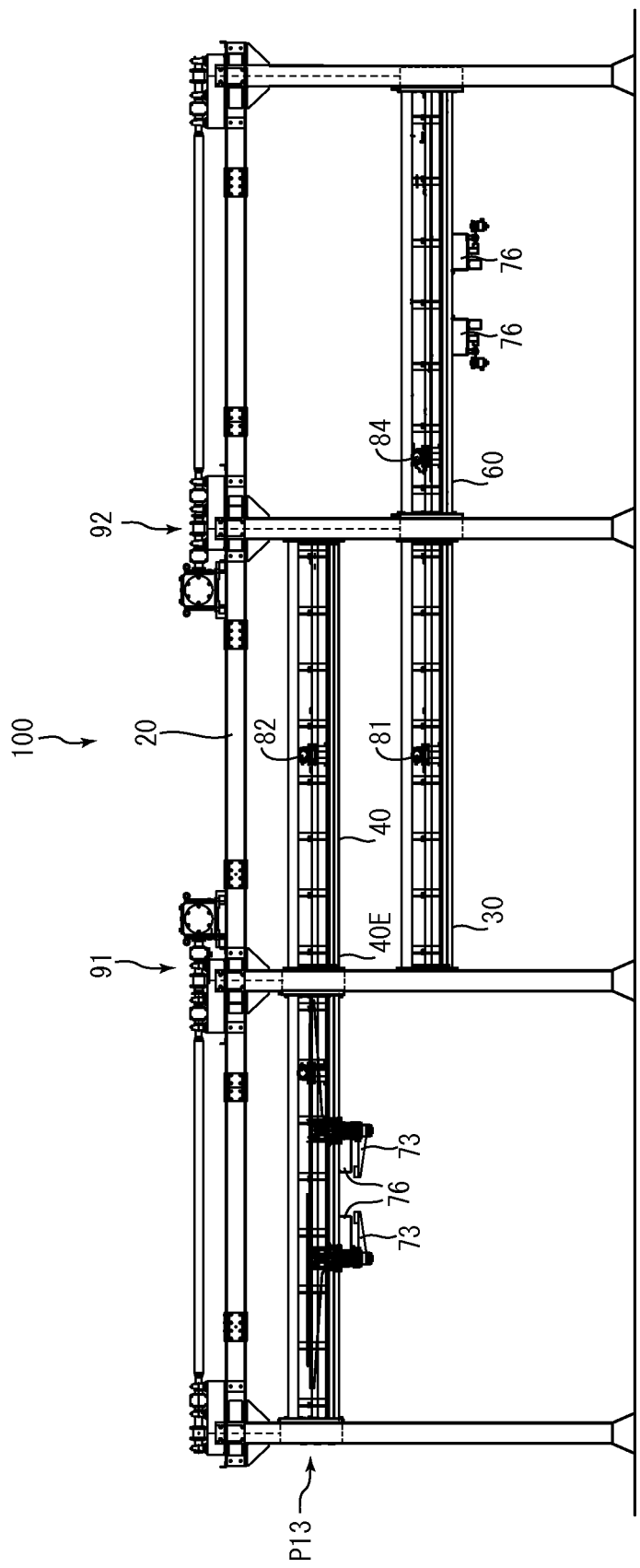
FIG. 27 is a right side view of the assembly/transport apparatus.

In FIG. 27, the empty carrier 70 is stationary on the first transfer device 50. In this state, when another transport object M is supplied to below the first transfer device 50, the process returns to FIG. 19 and this transport object M can be transported.

[Effects of Assembly/Transport Apparatus 100]

In the assembly/transport apparatus 100 in the present embodiment described above, the transport track 30 includes a set of transport driving devices 81 provided to correspond to the transport stop position SF for a carrier 70. Further, the return track 40 includes a set of return driving devices 82 provided to correspond to the return stop position SR for a carrier 70. As the transport driving devices 81 and return driving devices 82 are disposed in a dispersed manner, a twisting effect or the like is not concentrated on the frame 20. This reduce the weight of the frame 20, thereby making it easier to install the assembly/transport apparatus 100.

In the assembly/transport apparatus 100, the transport driving devices 81, return driving devices 82, first transfer driving devices 83 and second transfer driving devices 84 are positioned to the left and right with respect to the assembly/transport apparatus 100. This eliminates the necessity for a mechanism for distributing a driving force to the left and right, which enables simplifying the structure of the assembly/transport apparatus 100.

In the assembly/transport apparatus 100, the transport driving devices 81, the return driving devices 82, the first transfer driving devices 83 and the second transfer driving devices 84 each includes a gear 86 that transmits a driving force to the carrier 70. The carrier 70 includes a power receiving portion 72 that receives the driving forces from these driving devices. That is, the transport track 30, return track 40, first transfer track 51 and second transfer track 61 have a common configuration for transmitting a driving force to the carrier 70. This enables simplifying the structure of the assembly/transport apparatus 100. Further, the use of a combination of the gear and pins 722 reduces noise and reduces the frequency of maintenance, such as oiling. Further, the use of a unified combination of the gear 86 and pins 722 allows them to be constructed as uniform components, which make it easy to address various layouts.

In the assembly/transport apparatus 100, the transport driving devices 81, the return driving devices 82, the first transfer driving devices 83 and the second transfer driving devices 84 each include a guiding device 87. The guiding device 87 guides the power receiving portion 72 of the carrier 70 from a state in which it is separated from the gear 86 to a state in which it is in contact with the 86. Thus, the gear 86 can engage with the power receiving portion 72 of the carrier 70 smoothly from the separated state to the contact state.

In the assembly/transport apparatus 100, the guiding device 87 includes a position changing mechanism 88 that changes the position of the gear 86 to be aligned with the power receiving portion 72 of the carrier 70. The position changing mechanism 88 causes the gear 86 to move to be aligned with the power receiving portion 72 of the carrier 70. Thus, the gear 86 can engage with the power receiving portion 72 of the carrier 70 smoothly from the separate state to the contact state.

The assembly/transport apparatus 100 includes a first hoisting device 91 and a second hoisting device 92. The first hoisting device 91 includes a first dividing device 951 that divides the driving force from the first hoisting driving source 91M among a plurality of first hoisting units 931. The second hoisting device 92 includes a second dividing device 952 that divides the driving force from the second hoisting driving source 92M among a plurality of second hoisting units 932. Thus, a simple arrangement may be used to raise and lower a plurality of first suspension members 931 and second suspension members 932 in a synchronized manner.

In the assembly/transport apparatus 100, a spur gear 753 for moving an arm 73 of the carrier 70 is provided on each of the first and second transfer devices 50 and 60. Thus, the carrier 70 needs to include no arrangement for driving the arm 73, which enables simplifying the structure of the arm 73.

[Variations]

While embodiments of the present invention have been described, the above embodiments are merely illustrative examples that may be used to carry out the present invention. Thus, the present invention is not limited to the above embodiments, and the above embodiments, when carried out, may be modified appropriately without departing from the spirit of the present invention.

The length of the transport track 30 and return track 40 of the assembly/transport apparatus 100 may be increased to increase the number of transport stop positions SF and return stop positions SR. To increase the length of the transport track 30 and return track 40, the number of vertical frame portions measured in the front/rear direction may be increased or the distance between the vertical frame portions may be increased. If the number of transport stop positions SF and return stop positions SR is increased, the number of transport driving devices 81 and return driving devices 82 is increased accordingly. Since the transport driving devices 81 and return driving devices 82 are disposed in a dispersed manner, a twisting effect or the like is not concentrated on the frame 20. Thus, even if the assembly/transport apparatus 100 has an increased length, the structure of the frame 20 can be simplified and thus its wright reduced, thereby making it easier to install the assembly/transport apparatus 100.

In the present embodiment, the transport track 30 and return track 40 are fixed to the frame 20; however, the present invention is not limited to this embodiment. For example, the transport track 30 and return track 40 may have the same construction as the first and second transfer devices 50 and 60 so as to be raised and lowered. In this case, the assembly/transport apparatus may be used in various work processes.

The transport driving devices 81 and return driving devices 82 are driven independently. Thus, all the carriers 70 may be caused to travel and stop simultaneously, or the carriers 70 may be caused to travel and stop individually.

EXPLANATION OF REFERENCE CHARACTERS

100 assembly/transport apparatus
20 frame
30 transport track
40 return track
50 first transfer device
51 first transfer track
60 second transfer device
61 second transfer track
70 carriers
81 transport driving devices
82 return driving devices
83 first transfer driving devices
84 second transfer driving devices
91 first hoisting device
92 second hoisting device

What is claimed is:

1. An assembly/transport apparatus comprising:
a carrier on which a transport object is mounted;
a transport track that extends in a transport direction and allows the carrier to travel, the transport direction being the direction in which the transport object is transported;
a return track that extends in a return direction and overlies the transport track in a top/bottom direction and allows the carrier to travel, the return direction being the direction opposite to the transport direction;
a first transfer device movable in the top/bottom direction between a position at which the first transfer device is connected with a starting end of the transport track and a position at which the first transfer device is connected with a terminating end of the return track, the first transfer device including a first transfer track that allows the carrier to travel, the first transfer device capable of transferring the carrier from the return track to the transport track;
a second transfer device movable in the top/bottom direction between a position at which the second transfer device is connected with a terminating end of the transport track and a position at which the second transfer device is connected with a starting end of the return track, the second transfer device including a second transfer track that allows the carrier to travel, the second transfer device capable of transferring the carrier from the transport track to the return track; and
a frame that supports the transport track, the return track, the first transfer device and the second transfer device,
the transport track including:
one or more transport stop positions that are defined as positions at which the carrier can stop;
a transport driving device provided to correspond to each transport stop position, the transport driving device driving the carrier in the transport direction and stopping the carrier at the transport stop position; and
a transport driving source provided for each transport driving device,
the return track including:
one or more return stop positions that are defined as positions at which the carrier can stop;
a return driving device provided to correspond to each return stop position, the return driving device driving the carrier in the return direction and stopping the carrier at the return stop position; and
a return driving source provided for each return driving device,
the first transfer device including:
a first transfer driving device that drives the carrier in the transport direction and the return direction and stops the carrier on the first transfer track; and
a first transfer driving source provided for the first transfer driving device,
the second transfer device including:
a second transfer driving device that drives the carrier in the transport direction and the return direction and stops the carrier on the second transfer track; and
a second transfer driving source provided for the second transfer driving device.

2. The assembly/transport apparatus according to claim 1, wherein the transport track includes a right transport track portion and a left transport track portion arranged in a left/right direction with respect to the transport direction, the left/right direction being a direction perpendicular to the transport direction and the return direction,
the right transport track portion and the left transport track portion each include the transport driving device provided to correspond to each transport stop position,
the return track includes a right return track portion and a left return track portion arranged in the left/right direction with respect to the return direction,
the right return track portion and the left return track portion each include the return driving device provided to correspond to each return stop position,
the first transfer track includes a first right transfer track portion and a first left transfer track portion arranged in the left/right direction with respect to the transport direction,
the first right transfer track portion and the first left transfer track portion each include the first transfer driving device,
the second transfer track includes a second right transfer track portion and a second left transfer track portion arranged in the left/right direction with respect to the transport direction, and
the second right transfer track portion and the second left transfer track portion each include the second transfer driving device.

3. The assembly/transport apparatus according to claim 2, wherein the carrier includes a right carrier portion that travels on the right transport track portion, the right return track portion, the first right transfer track portion and the second right transfer track portion and a left carrier portion that travels on the left transport track portion, the left return track portion, the first left transfer track portion and the second left transfer track portion,
the carrier includes an arm that is rotatable about an up/down axis, and
the arm is rotatable between a first arm position in which the arm projects into a space between the right carrier portion and the left carrier portion and the transport object can be mounted, and a second arm position in which the arm is withdrawn from the space between the right carrier portion and the left carrier portion.

4. The assembly/transport apparatus according to claim 1, wherein the transport driving device, the return driving device, the first transfer driving device and the second transfer driving device each include a transmission unit that transmits a driving force to the carrier, the carrier includes a power receiving portion that extends in a travel direction and is contactable with the transmission unit to receive a driving force from the transport driving device, the return driving device, the first transfer driving device and the second transfer driving device, the travel direction being the direction in which the carrier travels, and the power receiving portion has a length that makes the power receiving portion contactable with two of the transmission units that are adjacent in the transport direction at the same time when the carrier travels in the transport direction and contactable with two of the transmission units that are adjacent in the return direction at the same time when the carrier travels in the return direction.

5. The assembly/transport apparatus according to claim 4, wherein the transport driving device, the return driving device, the first transfer driving device and the second transfer driving device each include a guiding device that guides the power receiving portion of the carrier from a state in which the power receiving portion is separated from the transmission unit to a state in which the power receiving portion is in contact with the transmission unit.

6. The assembly/transport apparatus according to claim 5, wherein the guiding device includes a position changing mechanism that changes a position of the transmission unit to be aligned with the power receiving portion of the carrier.

7. The assembly/transport apparatus according to claim 1, further comprising:

a first hoisting device that raises and lowers the first transfer device along the frame; and a second hoisting device that raises and lowers the second transfer device along the frame, the first hoisting device including:

a plurality of first suspension members connected with the first transfer device;

a plurality of first hoisting units provided to correspond to the first suspension members for raising and lowering the first suspension members;

a first dividing device connected with the plurality of first hoisting units for dividing a driving force among the plurality of first hoisting units; and a first hoisting driving source that supplies a driving force to the first dividing device, the second hoisting device including:

a plurality of second suspension members connected with the second transfer device;

a plurality of second hoisting units provided to correspond to the second suspension members for raising and lowering the second suspension members;

a second dividing device connected with the plurality of second hoisting units for dividing a driving force among the plurality of second hoisting units; and a second hoisting driving source that supplies a driving force to the second dividing device.

8. The assembly/transport apparatus according to claim 1, wherein the carrier includes:

an arm rotatable between a first arm position in which the transport object can be mounted and a second arm position in which the arm is withdrawn from the transport object; and an operated portion connected with the arm and movable between a first operated position that corresponds to the first arm position and a second operated position that corresponds to the second arm position, and the first transfer device and the second transfer device each include an operating unit that is movable between an engaged position in which the operating unit engages with the operated portion and a withdrawn position in which the operating unit is withdrawn from the operated portion, the operating unit being capable of moving the operated portion between the first operated position and the second operated position while in the engaged position in which the operating unit engages with the operated portion.

9. The assembly/transport apparatus according to claim 1, wherein the frame includes a plurality of vertical frame portions that extend in the top/bottom direction and support the first transfer track and the second transfer track, in each of the plurality of vertical frame portions, an up/down travelling device is provided that travels in the up/down direction along the vertical frame portion, and the first transfer track and the second transfer track are supported by the vertical frame portions via the associated up/down travelling devices.

* * * * *